(12) United States Patent
Min et al.

(10) Patent No.: US 12,511,002 B2
(45) Date of Patent: *Dec. 30, 2025

(54) TOUCH-CONTROL PANEL AND TOUCH-CONTROL DISPLAYING DEVICE

(71) Applicants: Chengdu BOE Optoelectronics Technology Co., Ltd., Sichuan (CN); BOE Technology Group Co., Ltd., Beijing (CN)

(72) Inventors: Hang Min, Beijing (CN); Guiyu Zhang, Beijing (CN); Qiang Wang, Beijing (CN); Zhiqiang Wang, Beijing (CN); Hongqiang Luo, Beijing (CN); Liqing Jiang, Beijing (CN); Ping Luo, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/912,776

(22) Filed: Oct. 11, 2024

(65) Prior Publication Data

US 2025/0036246 A1    Jan. 30, 2025

Related U.S. Application Data

(63) Continuation of application No. 17/779,746, filed as application No. PCT/CN2021/104462 on Jul. 5, 2021, now Pat. No. 12,182,371.

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0445* (2019.05)

(58) Field of Classification Search
CPC ...... G06F 3/041–047; G06F 2203/041–04114; G06F 3/0443;
(Continued)

(56) References Cited

U.S. PATENT DOCUMENTS

2020/0032863 A1   1/2020  Li et al.
2020/0328363 A1*  10/2020 Guo .................. H10K 59/40

FOREIGN PATENT DOCUMENTS

CN    104156118 A   11/2014
CN    105425992 A    3/2016
(Continued)

OTHER PUBLICATIONS

CN-106298861-A (Year: 2017).*
(Continued)

*Primary Examiner* — Sanjiv D. Patel
(74) *Attorney, Agent, or Firm* — WHDA, LLP

(57) ABSTRACT

A touch-control panel and a touch-control displaying device, which relates to the technical field of touch control. In the present application, by providing the first carrier element, the first electrically conductive layer and the first shadow eliminating layer on the substrate, by blocking the first electrically conductive layer by using the first shadow eliminating layer, the reflectivity of the first electrically conductive layer is reduced, which reduces the pattern of the first electrically conductive layer being observed under intensive-light reflection.

16 Claims, 9 Drawing Sheets

(58) Field of Classification Search
CPC ......... G06F 2203/04103; G06F 3/0448; G06F 3/0446; G06F 3/044; G02F 1/13338
See application file for complete search history.

(56) References Cited

FOREIGN PATENT DOCUMENTS

| | | | |
|---|---|---|---|
| CN | 106020560 | A | 10/2016 |
| CN | 106298861 | A * | 1/2017 |
| CN | 109669578 | A | 4/2019 |
| CN | 110828698 | A | 2/2020 |
| CN | 211628226 | U | 10/2020 |
| WO | 2016201891 | A1 | 12/2016 |

OTHER PUBLICATIONS

Non-Final Office Action dated May 13, 2024, issued in U.S. Appl. No. 17/779,746 (19 pages).
Notice of Allowance dated Aug. 20, 2024, issued in U.S. Appl. No. 17/779,746 (8 pages).
Notice of Allowance dated Sep. 3, 2024, issued in U.S. Appl. No. 17/779,746 (6 pages).

* cited by examiner

TOUCH-CONTROL PANEL AND TOUCH-CONTROL DISPLAYING DEVICE

CROSS-REFERENCE TO RELATED APPLICATION

This is a continuation application of U.S. application Ser. No. 17/779,746, filed on May 25, 2022, which is a 371 of PCT/CN2021/104462, filed on Jul. 5, 2021, the disclosure of which is hereby incorporated in its entirety by reference.

TECHNICAL FIELD

The present application relates to the technical field of touch control, and particularly relates to a touch-control panel and a touch-control displaying device.

BACKGROUND

With the development of the technique of touch controlling, because of the excellent characteristics of metal-mesh structures, such as low impedance and a good bending resistance, it has been extensively applied in the technical field of touch controlling.

SUMMARY

Some embodiments of the present disclosure provide the following technical solutions:

In the first aspect, there is provided a touch-control panel, wherein the touch-control panel comprises:
a substrate;
a first carrier element located on one side of the substrate, wherein the first carrier element has a plurality of first accommodating grooves;
a first electrically conductive layer, comprising a plurality of first electrically conducting lines, wherein each of the first electrically conducting lines is located inside one of the first accommodating grooves; and
a first shadow eliminating layer located inside the first accommodating grooves, wherein an orthographic projection of the first shadow eliminating layer on the substrate covers an orthographic projection of at least part of the first electrically conductive layer on the substrate.

Optionally, the first carrier element comprises:
a first carrier layer, wherein the first carrier layer has a plurality of first grooves; and
a second carrier layer located on one side of the first carrier layer that is away from the substrate, wherein the second carrier layer has a plurality of second grooves;
wherein the first accommodating groove comprises the first groove and the second groove, each of the first electrically conducting lines is located inside one of the first grooves, and the first shadow eliminating layer is located inside the second grooves; and
the first carrier layer is insulated from the first electrically conductive layer, and the second carrier layer is insulated from the first shadow eliminating layer.

Optionally, the first carrier element comprises a third carrier layer, and the third carrier layer has a plurality of third grooves;
the first accommodating grooves are the third grooves, both of the first electrically conducting lines and the first shadow eliminating layer are located inside the third grooves, and the first shadow eliminating layer is located on one side of the first electrically conducting line that is away from the substrate; and
the third carrier layer is insulated from both of the first electrically conductive layer and the first shadow eliminating layer.

Optionally, the touch-control panel further comprises:
a second carrier element located on one side of the substrate, wherein the second carrier element has a plurality of second accommodating grooves; and
a second electrically conductive layer, comprising a plurality of second electrically conducting lines, wherein each of the second electrically conducting lines is located inside one of the second accommodating grooves.

Optionally, the touch-control panel further comprises:
a second shadow eliminating layer located inside the second accommodating grooves, wherein an orthographic projection of the second shadow eliminating layer on the substrate covers an orthographic projection of at least part of the second electrically conductive layer on the substrate.

Optionally, the second carrier element comprises:
a fourth carrier layer, wherein the fourth carrier layer has a plurality of fourth grooves; and
a fifth carrier layer located on a same side of the substrate where the fourth carrier layer is located, wherein the fifth carrier layer has a plurality of fifth grooves;
wherein the second accommodating groove comprises the fourth groove and the fifth groove, the second shadow eliminating layer is located inside the fourth grooves, and each of the second electrically conducting lines is located inside one of the fifth grooves; and
the fourth carrier layer is insulated from the second shadow eliminating layer, and the fifth carrier layer is insulated from the second electrically conductive layer.

Optionally, the second carrier element comprises a sixth carrier layer, and the sixth carrier layer has a plurality of sixth grooves;
the second accommodating grooves are the sixth grooves, and both of the second shadow eliminating layer and the second electrically conducting lines are located inside the sixth grooves; and
the sixth carrier layer is insulated from both of the second shadow eliminating layer and the second electrically conductive layer.

Optionally, the first carrier element is located on a first side of the substrate, and the second carrier element is located on a second side of the substrate, wherein the first side and the second side are two opposite sides of the substrate.

Optionally, the first carrier element and the second carrier element are located on a same side of the substrate, the second carrier element is located on one side of the first carrier element that is away from the substrate, and an insulating layer is provided between the first carrier element and the second carrier element.

Optionally, the orthographic projection of the first shadow eliminating layer on the substrate covers the entire orthographic projection of the first electrically conductive layer on the substrate; and
the orthographic projection of the second shadow eliminating layer on the substrate covers the entire orthographic projection of the second electrically conductive layer on the substrate.

Optionally, the plurality of first electrically conducting lines form a plurality of first electrically conducting grids, the first electrically conducting lines, which correspond to at least some of the plurality of first electrically conducting grids, have first notches, and the first notches separate the first electrically conductive layer into a plurality of first electrically conducting elements;

the plurality of second electrically conducting lines form a plurality of second electrically conducting grids, the second electrically conducting lines, which correspond to at least some of the plurality of second electrically conducting grids, have second notches, and the second notches separate the second electrically conductive layer into a plurality of second electrically conducting elements; and the plurality of first electrically conducting elements and the plurality of second electrically conducting elements together form a latticed first touch-controlling electrode and a latticed second touch-controlling electrode.

Optionally, the plurality of first electrically conducting elements include a plurality of instances of the first touch-controlling electrode that extend in a first direction, and the plurality of second electrically conducting elements include a plurality of instances of the second touch-controlling electrode that extend in a second direction, wherein the first direction intersects with the second direction.

Optionally, one of the plurality of first electrically conducting elements and the plurality of second electrically conducting elements include a plurality of instances of the first touch-controlling electrode that extend in a first direction and a plurality of electrode main-body parts, and the other include a plurality of bridging electrodes; and each of the bridging electrodes is connected to two neighboring instances of the electrode main-body parts in a second direction by via holes extending throughout a medium layer, to form a plurality of instances of the second touch-controlling electrode that extend in the second direction, wherein the first direction intersects with the second direction;

wherein the medium layer is a film layer between the first electrically conductive layer and the second electrically conductive layer.

Optionally, a line width of the first electrically conducting lines is less than or equal to a line width of the second electrically conducting lines.

Optionally, both of a material of the first carrier element and a material of the second carrier element are a photo-solidified adhesive.

Optionally, both of the first shadow eliminating layer and the second shadow eliminating layer are a light shielding ink layer or a light shielding oxide layer, and a transmittance of the first shadow eliminating layer and a transmittance of the second shadow eliminating layer are less than or equal to 10%.

Optionally, the first electrically conductive layer and the second electrically conductive layer are an electrically conductive silver-paste layer; or a material of the first electrically conductive layer and a material of the second electrically conductive layer are at least one of copper, molybdenum, aluminum and titanium.

Optionally, the first electrically conducting grids and the second electrically conducting grids are arranged in stagger.

Optionally, all of cross-sectional shapes in a target cross section of the first electrically conducting lines, the first shadow eliminating layer inside each of the first accommodating grooves, the second electrically conducting lines and the second shadow eliminating layer inside each of the second accommodating grooves are substantially a trapezoid;

a cross-sectional shape in the target cross section of a combined component of the first shadow eliminating layer and the first electrically conducting line inside each of the first accommodating grooves is substantially a trapezoid; and a cross-sectional shape in the target cross section of a combined component of the second shadow eliminating layer and the second electrically conducting line inside each of the second accommodating grooves is substantially a trapezoid;

wherein the target cross section is perpendicular to a plane where the substrate is located, and is parallel to a direction of a line width of the electrically conducting lines inside a corresponding accommodating groove.

Optionally, a sum between a thickness of the first electrically conductive layer and a thickness of the first shadow eliminating layer is substantially equal to a thickness of the first carrier element; and a sum between a thickness of the second electrically conductive layer and a thickness of the second shadow eliminating layer is substantially equal to a thickness of the second carrier element.

Optionally, a surface of one side of the first electrically conductive layer that is away from the substrate and a surface of one side of the first carrier layer that is away from the substrate are substantially located in a same plane; and a surface of one side of the first shadow eliminating layer that is away from the substrate and a surface of one side of the second carrier layer that is away from the substrate are substantially located in a same plane.

Optionally, a surface of one side of the second shadow eliminating layer that is away from the substrate and a surface of one side of the fourth carrier layer that is away from the substrate are substantially located in a same plane; and a surface of one side of the second electrically conductive layer that is away from the substrate and a surface of one side of the fifth carrier layer that is away from the substrate are substantially located in a same plane.

Optionally, the plurality of first electrically conducting elements further include a plurality of first leisure electrodes provided between two neighboring instances of the first touch-controlling electrode, and each of the first leisure electrodes is insulated from the first touch-controlling electrodes by the first notches; and the plurality of second electrically conducting elements further include a plurality of second leisure electrodes provided between two neighboring instances of the second touch-controlling electrode, and each of the second leisure electrodes is insulated from the second touch-controlling electrodes by the second notches.

Optionally, between the first leisure electrodes and the first touch-controlling electrodes, a extension direction of a first trajectory line formed by any at least two neighboring instances of the first notches intersects with the first direction, and extension directions of any two neighboring instances of the first trajectory line are intersected;

the first trajectory line is a straight line segment formed by at least two neighboring instances of the first notches between the first leisure electrodes and the first touch-controlling electrodes, and the first electrically conducting line where the first notch closest to a starting of the first trajectory line is located are in parallel with the first electrically conducting line where the first notch closest to an ending of the first trajectory line is located;

between the second leisure electrodes and the second touch-controlling electrodes, a extension direction of a second trajectory line formed by any at least two neighboring instances of the second notches intersects with the second direction, and extension directions of any two neighboring instances of the second trajectory line are intersected; and the second trajectory line is a straight line segment formed by at least two neighboring instances of the second notches between the second leisure electrodes and the second touch-controlling electrodes, and the second electrically conducting line where the second notch closest to a starting of the second trajectory line is located are in parallel with the second electrically conducting line where the second notch closest to an ending of the second trajectory line is located.

Optionally, each of the first leisure electrodes is separate from neighboring instances of the first leisure electrodes by a third trajectory line formed by the first notches, the third trajectory line is a straight line segment formed by at least two neighboring instances of the first notches between two instances of the first leisure electrodes, and the first electrically conducting line where the first notch closest to a starting of the third trajectory line is located are in parallel with the first electrically conducting line where the first notch closest to an ending of the third trajectory line is located; and each of the second leisure electrodes is separate from neighboring instances of the second leisure electrodes by a fourth trajectory line formed by the second notches, the fourth trajectory line is a straight line segment formed by at least two neighboring instances of the second notches between two instances of the second leisure electrodes, and the second electrically conducting line where the second notch closest to a starting of the fourth trajectory line is located are in parallel with the second electrically conducting line where the second notch closest to an ending of the fourth trajectory line is located.

Optionally, at least some of the first leisure electrodes in all of the first leisure electrodes comprise at least one closed instance of the first electrically conducting grids; and at least some of the second leisure electrodes in all of the second leisure electrodes comprise at least one closed instance of the second electrically conducting grids.

Optionally, the plurality of first electrically conducting elements or the plurality of second electrically conducting elements further include a plurality of third leisure electrodes and a plurality of fourth leisure electrodes, and each of the third leisure electrodes and each of the fourth leisure electrodes are provided in a same layer as the first touch-controlling electrodes and the electrode main-body parts;

each of the third leisure electrodes is located within a region enclosed by the first touch-controlling electrodes, and each of the third leisure electrodes is insulated from the first touch-controlling electrodes by target notches;

each of the fourth leisure electrodes is located within a region enclosed by the electrode main-body parts, and each of the fourth leisure electrodes is insulated from the electrode main-body parts by the target notches; and the first touch-controlling electrodes and the electrode main-body parts are insulated by the target notches, and two neighboring instances of the electrode main-body parts in the first direction are insulated by the target notches;

wherein the target notches are the first notches or the second notches.

Optionally, between the first touch-controlling electrodes and the electrode main-body parts, a extension direction of a fifth trajectory line formed by any at least two neighboring instances of the target notches intersects with the first direction, and extension directions of any two neighboring instances of the fifth trajectory line are intersected; and the fifth trajectory line is a straight line segment formed by at least two neighboring instances of the target notches between the first touch-controlling electrodes and the electrode main-body parts, and the target electrically conducting line where the target notch closest to a starting of the fifth trajectory line is located are in parallel with the target electrically conducting line where the target notch closest to an ending of the fifth trajectory line is located, wherein the target electrically conducting line is the first electrically conducting line or the second electrically conducting line.

Optionally, at least some of the third leisure electrodes in all of the third leisure electrodes comprise at least one closed target electrically conducting grid; and at least some of the fourth leisure electrodes in all of the fourth leisure electrodes comprise at least one closed instance of the target electrically conducting grid;

wherein the target electrically conducting grid is the first electrically conducting grids or the second electrically conducting grids.

In the second aspect, there is provided a touch-control displaying device, wherein the touch-control displaying device comprises a display panel and the touch-control panel stated above, and the display panel is located on one side of the substrate that is away from the first carrier element.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present application or the prior art, the figures that are required to describe the embodiments or the prior art will be briefly introduced below. Apparently, the figures that are described below are embodiments of the present application, and a person skilled in the art can obtain other figures according to these figures without paying creative work.

DETAILED DESCRIPTION

In order to make the objects, the technical solutions and the advantages of the embodiments of the present application clearer, the technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Figure 1:
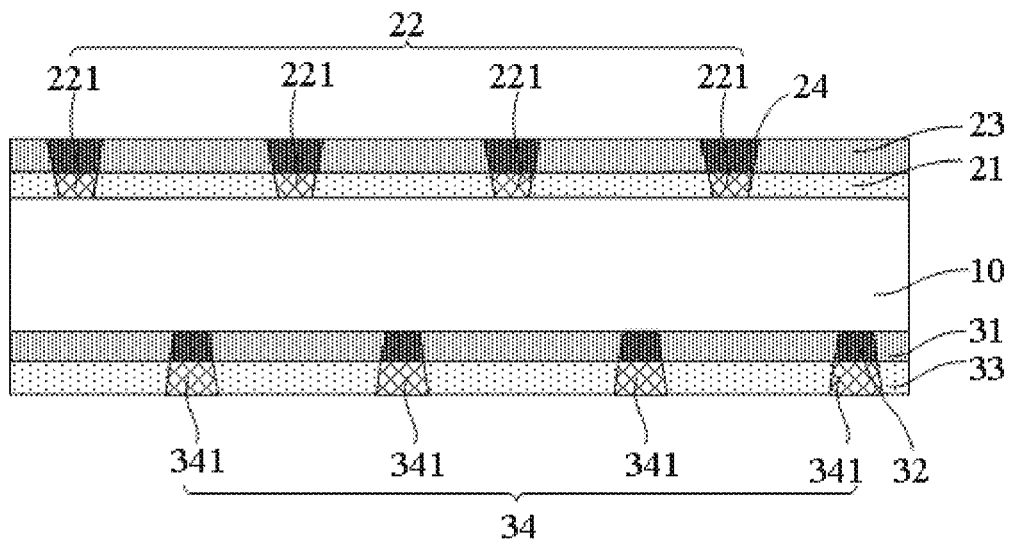
FIG. 1 schematically shows a schematic structural diagram of the first touch-control panel according to an embodiment of the present application.
Figure 2:
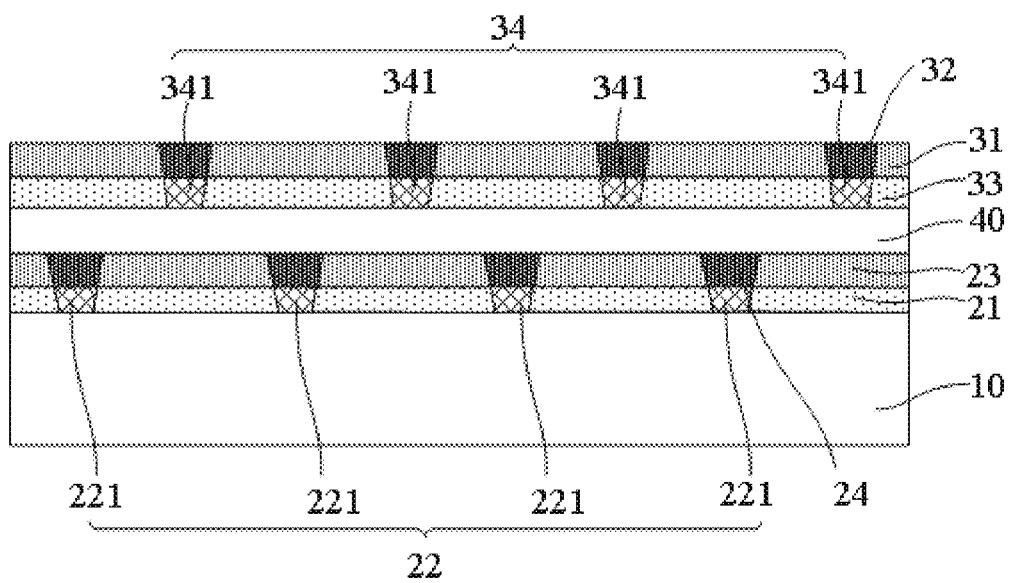
FIG. 2 schematically shows a schematic structural diagram of the second touch-control panel according to an embodiment of the present application.
Figure 3:
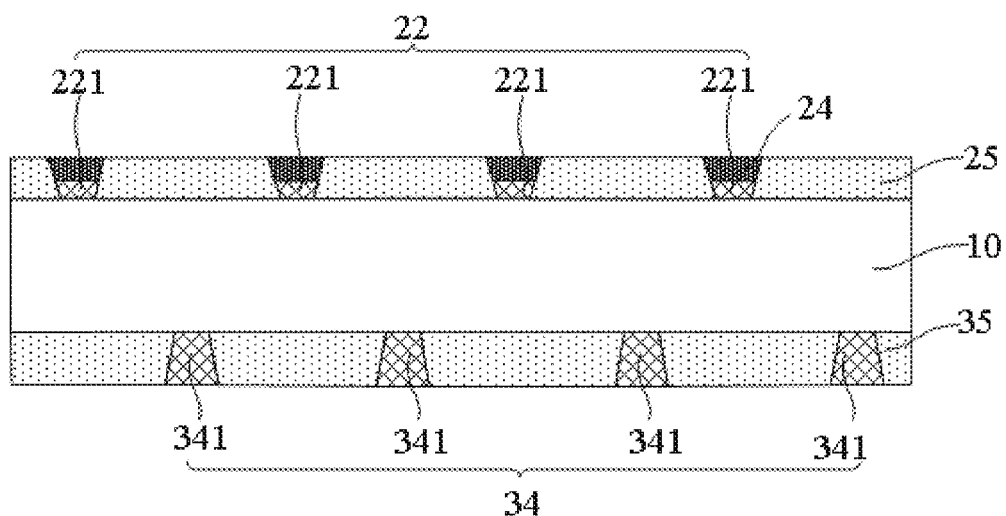
FIG. 3 schematically shows a schematic structural diagram of the third touch-control panel according to an embodiment of the present application.
Figure 4:
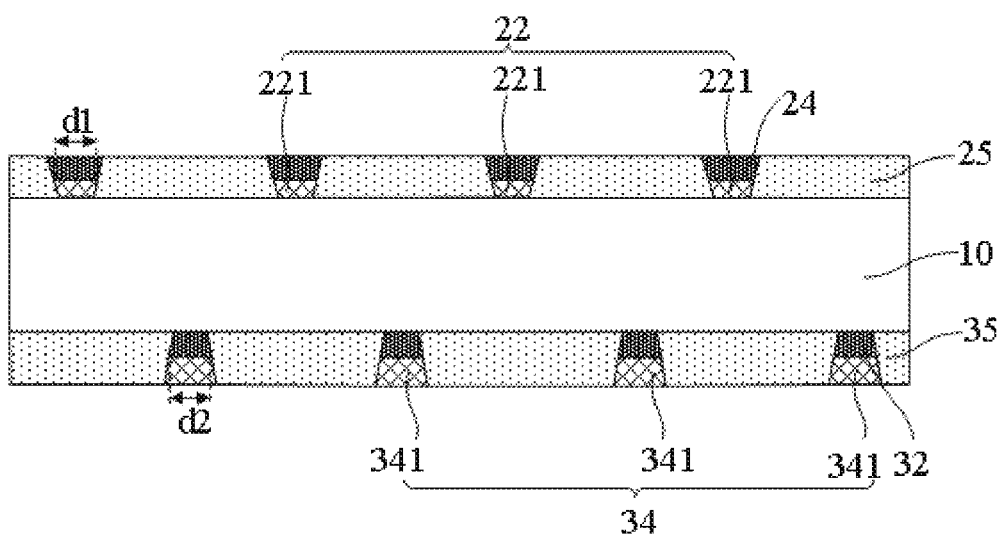
FIG. 4 schematically shows a schematic structural diagram of the fourth touch-control panel according to an embodiment of the present application.
Figure 5:
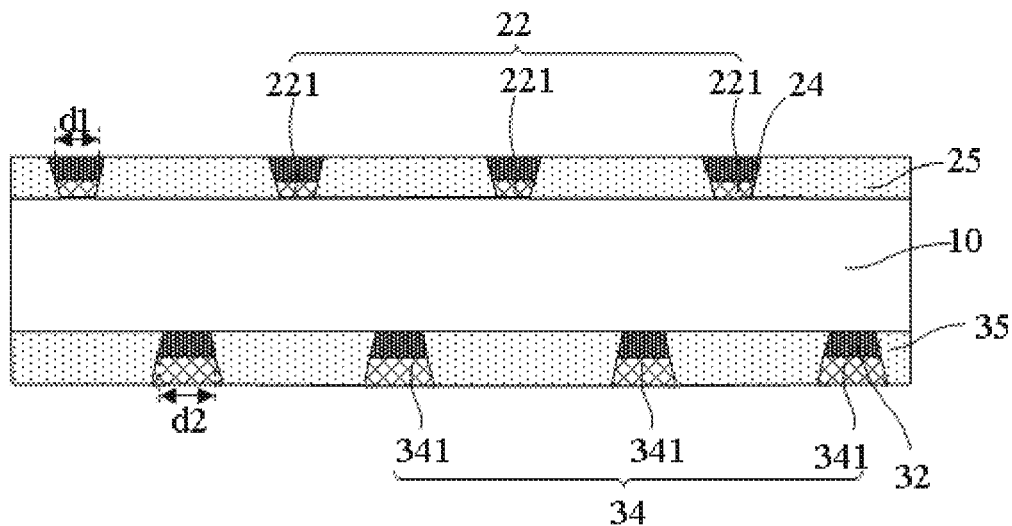
FIG. 5 schematically shows a schematic structural diagram of the fifth touch-control panel according to an embodiment of the present application.

Referring to FIG. 1, a schematic structural diagram of the first touch-control panel according to an embodiment of the present application is shown. FIG. 2 shows a schematic structural diagram of the second touch-control panel according to an embodiment of the present application. FIG. 3 shows a schematic structural diagram of the third touch-control panel according to an embodiment of the present application. FIG. 4 shows a schematic structural diagram of the fourth touch-control panel according to an embodiment of the present application. FIG. 5 shows a schematic structural diagram of the fifth touch-control panel according to an embodiment of the present application.

An embodiment of the present application discloses a touch-control panel, wherein the touch-control panel comprises a substrate 10; a first carrier element located on one side of the substrate 10, wherein the first carrier element has a plurality of first accommodating grooves; a first electrically conductive layer 22, comprising a plurality of first electrically conducting lines 221, wherein each of the first electrically conducting lines 221 is located inside one of the first accommodating grooves; and a first shadow eliminating layer 24 located inside the first accommodating grooves, wherein the orthographic projection of the first shadow eliminating layer 24 on the substrate 10 covers the orthographic projection of at least part of the first electrically conductive layer 22 on the substrate 10.

In the practical product, the substrate 10 may be a flexible substrate, and its material may be PET (Polyethylene Terephthalate), acrylics, COP (Cyclo Olefin Polymer), PI (Polyimide) and so on. The substrate 10 may also be a rigid substrate.

The first carrier element, the first electrically conductive layer 22 and the first shadow eliminating layer 24 are arranged sequentially on one side of the substrate 10, and all of the first carrier element, the first electrically conductive layer 22 and the first shadow eliminating layer 24 are located on the same side of the substrate 10.

The first carrier element has a plurality of first accommodating grooves. Each of the first accommodating grooves extends throughout the first carrier element; in other words, in the direction perpendicular to the plane where the substrate 10 is located, the depth of the first accommodating grooves is equal to the thickness of the first carrier element. The first electrically conductive layer 22 comprises a plurality of first electrically conducting lines 221, and each of the first electrically conducting lines 221 is located inside one of the first accommodating grooves. Moreover, the first shadow eliminating layer 24 is also located inside the first accommodating grooves, wherein the orthographic projection of the first shadow eliminating layer 24 on the substrate 10 covers the orthographic projection of at least part of the first electrically conductive layer 22 on the substrate 10.

By blocking the first electrically conductive layer 22 by the first shadow eliminating layer 24, the reflectivity of the first electrically conductive layer 22 is reduced, which reduces the pattern of the first electrically conductive layer 22 being observed under intensive-light reflection, to improve the visual effect of the product.

In an optional embodiment, as shown in FIGS. 1 and 2, the first carrier element comprises: a first carrier layer 21, wherein the first carrier layer 21 has a plurality of first grooves; and a second carrier layer 23 located on the side of the first carrier layer 21 that is away from the substrate 10, wherein the second carrier layer 23 has a plurality of second grooves. The first accommodating groove comprises the first groove and the second groove, each of the first electrically conducting lines 221 is located inside one of the first grooves, and the first shadow eliminating layer 24 is located inside the second grooves. The first carrier layer 21 is insulated from the first electrically conductive layer 22, and the second carrier layer 23 is insulated from the first shadow eliminating layer 24.

In this case, the first carrier element comprises two carrier layers, i.e., the first carrier layer 21 and the second carrier layer 23. The first carrier layer 21 has a plurality of first grooves. Each of the first grooves extends throughout the first carrier layer 21; in other words, in the direction perpendicular to the plane where the substrate 10 is located, the depth of the first grooves is equal to the thickness of the first carrier layer 21. The first electrically conductive layer 22 comprises a plurality of first electrically conducting lines 221, and each of the first electrically conducting lines 221 is located inside one of the first grooves. The second carrier layer 23 has a plurality of second grooves. Each of the second grooves extends throughout the second carrier layer 23; in other words, in the direction perpendicular to the plane where the substrate 10 is located, the depth of the second grooves is equal to the thickness of the second carrier layer 23. Furthermore, the orthographic projection of the second groove on the substrate 10 covers the orthographic projection of at least part of the first groove on the substrate 10. The first groove and the second groove together form the first accommodating groove. The first shadow eliminating layer 24 is located inside the second grooves, wherein the orthographic projection of the first shadow eliminating layer 24 on the substrate 10 covers the orthographic projection of at least part of the first electrically conductive layer 22 on the substrate 10.

In the practical product, if the depth of the grooves of the carrier layers is too high, groove deformation happens easily in the process of the mold falling after the grooves of the carrier layers have been formed by impression. Therefore, as limited by the manufacture process, the depth of the grooves of each of the carrier layers is substantially equal to the line width of the electrically conducting lines in the electrically conductive layers.

Therefore, in the embodiments of the present application, by adding the second carrier layer 23 on the side of the first carrier layer 21 that is away from the substrate 10, providing merely the first electrically conductive layer 22 inside the first grooves of the first carrier layer 21, and providing merely the first shadow eliminating layer 24 inside the second grooves of the second carrier layer 23, the first electrically conductive layer 22 can have a sufficient thickness, which prevents reduction of the thickness of the first electrically conductive layer caused by the simultaneous provision of the first electrically conductive layer and the first shadow eliminating layer inside the same carrier layer. Therefore, the touch-control panels shown in FIGS. 1 and 2 can ensure that the thickness of the first electrically conductive layer 22 satisfies the demands, and if the thickness of the first electrically conductive layer 22 is higher, the impedance corresponding to it is lower, which can improve the electric characteristics of the first electrically conductive layer 22, to improve the effect of touch controlling.

Furthermore, as shown in FIGS. 1 and 2, when the first electrically conductive layer 22 and the first shadow eliminating layer 24 are located inside the grooves of different carrier layers, the first shadow eliminating layer 24 also has a sufficient thickness, which can prevent the pattern of the first electrically conductive layer 22 from being observed due to a low thickness of the first shadow eliminating layer 24, thereby improving the effect of light shielding of the first shadow eliminating layer 24, further reducing the reflectivity of the first electrically conductive layer 22, and preventing the pattern of the first electrically conductive layer 22 from being observed under intensive-light reflection, to improve the visual effect of the product.

In another optional embodiment, as shown in FIGS. 3 to 5, the first carrier element comprises a third carrier layer 25, and the third carrier layer 25 has a plurality of third grooves. the first accommodating grooves are the third grooves, both of the first electrically conducting lines 221 and the first shadow eliminating layer 24 are located inside the third grooves, and the first shadow eliminating layer 24 is located on the side of the first electrically conducting line 221 that is away from the substrate 10. The third carrier layer 25 is insulated from both of the first electrically conductive layer 22 and the first shadow eliminating layer 24.

In this case, the first carrier element comprises merely one carrier layer, i.e., the third carrier layer 25. The third carrier layer 25 has a plurality of third grooves. Each of the third grooves extends throughout the third carrier layer 25; in other words, in the direction perpendicular to the plane where the substrate 10 is located, the depth of the third grooves is equal to the thickness of the third carrier layer 25. Furthermore, both of the first electrically conducting lines 221 and the first shadow eliminating layer 24 are located inside the third grooves.

By configuring the first carrier element to comprise merely the third carrier layer 25, and providing the first electrically conducting lines 221 and the first shadow eliminating layer 24 inside the third grooves of the third carrier layer 25, the steps of the process of fabricating the third carrier layer 25 can be saved.

Optionally, the orthographic projection of the first shadow eliminating layer 24 on the substrate 10 covers the entire orthographic projection of the first electrically conductive layer 22 on the substrate 10.

Particularly, the orthographic projection of the first shadow eliminating layer 24 on the substrate 10 may coincide with the orthographic projection of the first electrically conductive layer 22 on the substrate 10. Alternatively, the orthographic projection of the first shadow eliminating layer 24 on the substrate 10 does not only cover the orthographic projection of the first electrically conductive layer 22 on the substrate 10, but also may cover the orthographic projection of part of the first carrier element on the substrate 10, for example, the first carrier layer 21 in FIGS. 1 and 2, or the third carrier layer 25 in FIGS. 3 to 5.

When the orthographic projection of the first shadow eliminating layer 24 on the substrate 10 covers the entire orthographic projection of the first electrically conductive layer 22 on the substrate 10, the first electrically conductive layer 22 can be blocked by the first shadow eliminating layer 24, whereby the metal grids corresponding to the first electrically conductive layer 22 have a very low visibility.

In an embodiment of the present application, the touch-control panel further comprises: a second carrier element located on one side of the substrate 10, wherein the second carrier element has a plurality of second accommodating grooves; and a second electrically conductive layer 34, comprising a plurality of second electrically conducting lines 341, wherein each of the second electrically conducting lines 341 is located inside one of the second accommodating grooves.

In the practical product, the second carrier element and the second electrically conductive layer 34 are arranged on one side of the substrate 10, and both of the second carrier element and the second electrically conductive layer 34 are located on the same side of the substrate 10.

The second carrier element has a plurality of second accommodating grooves. Each of the second accommodating grooves extends throughout the second carrier element; in other words, in the direction perpendicular to the plane where the substrate 10 is located, the depth of the second accommodating grooves is equal to the thickness of the second carrier element. The second electrically conductive layer 34 comprises a plurality of second electrically conducting lines 341, and each of the second electrically conducting lines 341 is located inside one of the second accommodating grooves.

In practice, the first electrically conductive layer 22 and the second electrically conductive layer 34 form the touch-controlling electrode required by the touch-control panel.

Optionally, as shown in FIGS. 1, 2, 4 and 5, the touch-control panel further comprises: a second shadow eliminating layer 32 located inside the second accommodating grooves, wherein the orthographic projection of the second shadow eliminating layer 32 on the substrate 10 covers the orthographic projection of at least part of the second electrically conductive layer 34 on the substrate 10.

By blocking the second electrically conductive layer 34 by the second shadow eliminating layer 32, the reflectivity of the second electrically conductive layer 34 is reduced, which reduces the pattern of the second electrically conductive layer 34 being observed under intensive-light reflection, to improve the visual effect of the product.

As shown in FIGS. 1 and 2, the second carrier element comprises: a fourth carrier layer 31, wherein the fourth carrier layer 31 has a plurality of fourth grooves; and a fifth carrier layer 33 located on the same side of the substrate 10 where the fourth carrier layer 31 is located, wherein the fifth carrier layer 33 has a plurality of fifth grooves. The second accommodating groove comprises the fourth groove and the fifth groove, the second shadow eliminating layer 32 is located inside the fourth grooves, and each of the second electrically conducting lines 34 is located inside one of the fifth grooves. The fourth carrier layer 31 is insulated from the second shadow eliminating layer 32, and the fifth carrier layer 33 is insulated from the second electrically conductive layer 34.

In this case, the second carrier element comprises two carrier layers, i.e., the fourth carrier layer 31 and the fifth carrier layer 33. The fourth carrier layer 31, the second shadow eliminating layer 32, the fifth carrier layer 33 and the second electrically conductive layer 34 are arranged on one side of the substrate 10. When the touch-control panel according to the embodiments of the present application is adhered to the display panel, the fourth carrier layer 31 is located on the side of the fifth carrier layer 33 that is away from the display panel.

The fourth carrier layer 31 has a plurality of fourth grooves. Each of the fourth grooves extends throughout the fourth carrier layer 31; in other words, in the direction perpendicular to the plane where the substrate 10 is located, the depth of the fourth grooves is equal to the thickness of the fourth carrier layer 31. The second shadow eliminating layer 32 is located inside the fourth grooves. The fifth carrier layer 33 has a plurality of fifth grooves. Each of the fifth grooves extends throughout the fifth carrier layer 33; in other words, in the direction perpendicular to the plane where the substrate 10 is located, the depth of the fifth grooves is equal to the thickness of the fifth carrier layer 33. Furthermore, the orthographic projection of the fourth groove on the substrate 10 covers the orthographic projection of at least part of the fifth groove on the substrate 10. The fourth groove and the fifth groove together form the second accommodating groove. The second electrically conductive layer 34 comprises a plurality of second electrically conducting lines 341, and each of the second electrically conducting lines 341 is located inside one of the fifth grooves. The orthographic projection of the second shadow eliminating layer 32 on the substrate 10 covers the orthographic projection of at least part of the second electrically conductive layer 34 on the substrate 10.

Correspondingly, in the touch-control panel, by separately providing the fourth carrier layer 31 and the fifth carrier layer 33, providing merely the second shadow eliminating layer 32 inside the fourth grooves of the fourth carrier layer 31, and providing merely the second electrically conductive layer 34 inside the fifth grooves of the fifth carrier layer 33, the second electrically conductive layer 34 can have a sufficient thickness. Therefore, the impedance of the second electrically conductive layer 34 can be reduced, thereby improving the electric characteristics of the second electrically conductive layer 34, to improve the effect of touch controlling. In this case, the carrier layers of the touch-control panel are the first carrier layer 21, the second carrier layer 23, the fourth carrier layer 31 and the fifth carrier layer 33.

Furthermore, as shown in FIGS. 1 and 2, when the second shadow eliminating layer 32 and the second electrically conductive layer 34 are located inside the grooves of different carrier layers, the second shadow eliminating layer 32 also has a sufficient thickness, which can prevent the pattern of the second electrically conductive layer 34 from being observed due to a low thickness of the second shadow eliminating layer 32, thereby improving the effect of light shielding of the second shadow eliminating layer 32, further reducing the reflectivity of the second electrically conductive layer 34, and preventing the pattern of the second electrically conductive layer 34 from being observed under intensive-light reflection, to improve the visual effect of the product.

As shown in FIGS. 4 and 5, the second carrier element comprises a sixth carrier layer 35, and the sixth carrier layer 35 has a plurality of sixth grooves. The second accommodating grooves are the sixth grooves, and both of the second shadow eliminating layer 32 and the second electrically conducting lines 341 are located inside the sixth grooves. The sixth carrier layer 35 is insulated from both of the second shadow eliminating layer 32 and the second electrically conductive layer 34.

In this case, the second carrier element comprises merely one carrier layer, i.e., the sixth carrier layer 35. The sixth carrier layer 35 has a plurality of sixth grooves. Each of the sixth grooves extends throughout the sixth carrier layer 35; in other words, in the direction perpendicular to the plane where the substrate 10 is located, the depth of the sixth grooves is equal to the thickness of the sixth carrier layer 35. Furthermore, both of the second shadow eliminating layer 32 and the second electrically conducting lines 341 are located inside the sixth grooves.

By configuring the second carrier element to comprise merely the sixth carrier layer 35, and providing the second shadow eliminating layer 32 and the second electrically conducting lines 341 inside the sixth grooves of the sixth carrier layer 35, the steps of the process of fabricating the sixth carrier layer 35 can be saved.

It should be noted that, in the touch-control panel shown in FIG. 3, inside the second accommodating grooves of the second carrier element are merely provided the second electrically conducting lines 341, and is not provided the second shadow eliminating layer, in which case the second carrier element is the sixth carrier layer 35.

Optionally, the orthographic projection of the second shadow eliminating layer 32 on the substrate 10 covers the entire orthographic projection of the second electrically conductive layer 34 on the substrate 10.

Particularly, the orthographic projection of the second shadow eliminating layer 32 on the substrate 10 may coincide with the orthographic projection of the second electrically conductive layer 34 on the substrate 10. Alternatively, the orthographic projection of the second shadow eliminating layer 32 on the substrate 10 does not only cover the orthographic projection of the second electrically conductive layer 34 on the substrate 10, but also may cover the orthographic projection of part of the second carrier element on the substrate 10, for example, the fifth carrier layer 33 in FIGS. 1 and 2, or the sixth carrier layer 35 in FIGS. 4 and 5.

When the orthographic projection of the second shadow eliminating layer 32 on the substrate 10 covers the entire orthographic projection of the second electrically conductive layer 34 on the substrate 10, the second electrically conductive layer 34 can be blocked by the second shadow eliminating layer 32, whereby the metal grids corresponding to the second electrically conductive layer 34 have a very low visibility.

In the practical product, in the touch-control panel, the first electrically conductive layer 22 and the second electrically conductive layer 34 may be arranged on the two opposite sides of the substrate 10, and may also be arranged on the same side of the substrate 10. When the first electrically conductive layer 22 and the second electrically conductive layer 34 are arranged on the two opposite sides of the substrate 10, when the touch-control panel is subsequently bonded to an FPC (Flexible Printed Circuit), Double-face bonding is also required. When the first electrically conductive layer 22 and the second electrically conductive layer 34 are arranged on the same side of the substrate 10, when the touch-control panel is subsequently bonded to an FPC, merely single-face bonding is required.

As shown in FIGS. 1 and 3 to 5, the first carrier element is located on a first side of the substrate 10, and the second carrier element is located on a second side of the substrate 10, wherein the first side and the second side are two opposite sides of the substrate 10.

In this case, the first electrically conductive layer 22 and the second electrically conductive layer 34 are arranged on the two opposite sides of the substrate 10, and when the touch-control panel shown in FIGS. 1 and 3 to 5 is adhered to the display panel, the second side of the substrate 10 is closer to the display panel than the first side of the substrate 10.

As shown in FIG. 1, the first carrier layer 21 and the second carrier layer 23 are located on the first side of the substrate 10, and the fourth carrier layer 31 and the fifth carrier layer 33 are located on the second side of the substrate 10. As shown in FIGS. 3 to 5, the third carrier layer 25 is located on the first side of the substrate 10, and the sixth carrier layer 35 is located on the second side of the substrate 10.

Regarding the product shown in FIG. 1, in which the first electrically conductive layer 22 and the second electrically conductive layer 34 are arranged on the different sides, the second shadow eliminating layer 32 is placed inside the fourth grooves of the fourth carrier layer 31, and the second electrically conductive layer 34 is placed inside the fifth grooves of the fifth carrier layer 33. Because the contact area between the second electrically conductive layer 34 and the fifth carrier layer 33 is increased, the second electrically conductive layer 34 does not easily peel, thereby increasing the yield of the product.

As shown in FIG. 2, the first carrier element and the second carrier element are located on the same side of the substrate 10, the second carrier element is located on the side of the first carrier element that is away from the substrate 10, and an insulating layer 40 is provided between the first carrier element and the second carrier element.

In this case, all of the first carrier layer 21, the second carrier layer 23, the fourth carrier layer 31 and the fifth carrier layer 33 are located on the same side of the substrate 10, the fifth carrier layer 33 is located on the side of the second carrier layer 23 that is away from the first carrier layer 21, and the fourth carrier layer 31 is located on the side of the fifth carrier layer 33 that is away from the second carrier layer 23. An insulating layer 40 is provided between the second carrier layer 23 and the fifth carrier layer 33.

In this case, the first electrically conductive layer 22 and the second electrically conductive layer 34 are arranged on the same side of the substrate 10, and the second electrically conductive layer 34 is located between the second shadow eliminating layer 32 and the insulating layer 40. Furthermore, when the touch-control panel shown in FIG. 2 is adhered to the display panel, all of the first carrier layer 21, the second carrier layer 23, the fourth carrier layer 31 and the fifth carrier layer 33 are located on the side of the substrate 10 that is away from the display panel.

By adding the insulating layer 40 between the second carrier layer 23 and the fifth carrier layer 33, the distance between the first electrically conductive layer 22 and the second electrically conductive layer 34 can be increased, which prevents a too low distance between the first electrically conductive layer 22 and the second electrically conductive layer 34 to affect the effect of touch controlling. The thickness of the insulating layer 40 is 1.5 μm to 4 μm.

It should be noted that the cross-sectional shapes of the first grooves, the second grooves, the fourth grooves and the fifth grooves in the target cross section are rectangular or trapezoidal, or the cross-sectional shapes of the third grooves and the sixth grooves in the target cross section are rectangular or trapezoidal. The target cross section is perpendicular to the plane where the substrate 10 is located, and is parallel to the direction of the line width of the electrically conducting lines inside the corresponding accommodating groove.

For example, regarding the first grooves and the second grooves, the target cross section is parallel to the direction of the line width of the first electrically conducting lines 221, while regarding the fourth grooves and the fifth grooves, the target cross section is parallel to the direction of the line width of the second electrically conducting lines 341. Correspondingly, regarding the third grooves, the target cross section is parallel to the direction of the line width of the first electrically conducting lines 221, while regarding the sixth grooves, the target cross section is parallel to the direction of the line width of the second electrically conducting lines 341.

When the cross-sectional shapes of the accommodating grooves in the target cross section are trapezoidal, all of the cross-sectional shapes in a target cross section of the first electrically conducting lines 221, the first shadow eliminating layer 24 inside each of the first accommodating grooves, the second electrically conducting lines 341 and the second shadow eliminating layer 32 inside each of the second accommodating grooves are a trapezoid. The cross-sectional shape in the target cross section of the combined component of the first shadow eliminating layer 24 and the first electrically conducting line 221 inside each of the first accommodating grooves is a trapezoid. The cross-sectional shape in the target cross section of the combined component of the second shadow eliminating layer 32 and the second electrically conducting line 341 inside each of the second accommodating grooves is a trapezoid.

It should be noted that the cross-sectional shapes are trapezoidal refers to that the general shapes are trapezoidal, and variations within the process error range are allowed.

In other words, the side face of the combined component of the first shadow eliminating layer 24 and the first electrically conducting line 221 inside each of the first accommodating grooves is a smooth surface. Correspondingly, the side face of the combined component of the second shadow eliminating layer 32 and the second electrically conducting lines 341 inside each of the second accommodating grooves is also a smooth surface. The side face refers to the surface of the combined component that is not parallel to the plane where the substrate 10 is located.

Furthermore, regarding the product, in which the first electrically conductive layer 22 and the second electrically conductive layer 34 are arranged on the different sides, in the direction from the second carrier element pointing to the first carrier element, both of the cross-sectional shapes of the first electrically conducting line 221 and the first shadow eliminating layer 24 inside the first accommodating groove in the target cross section are an inversely placed trapezoid, in which case the orthographic projection of the first shadow eliminating layer 24 on the substrate 10 covers the entire orthographic projection of the first electrically conductive layer 22 on the substrate 10. Moreover, in the direction from the second carrier element pointing to the first carrier element, both of the cross-sectional shapes of the second electrically conducting line 341 and the second shadow eliminating layer 32 inside the second accommodating groove in the target cross section are an uprightly placed trapezoid, in which case the orthographic projection of the second shadow eliminating layer 32 on the substrate 10 covers the orthographic projection of part of the second electrically conductive layer 34 on the substrate 10.

Moreover, regarding the product, in which the first electrically conductive layer 22 and the second electrically conductive layer 34 are arranged on the same side, in the direction from the second carrier element pointing to the first carrier element, all of the cross-sectional shapes of the first electrically conducting line 221, the first shadow eliminating layer 24 inside the first accommodating groove, the second electrically conducting line 341 and the second shadow eliminating layer 32 inside the second accommodating groove in the target cross section are an inversely placed trapezoid, in which case the orthographic projection of the first shadow eliminating layer 24 on the substrate 10 covers the entire orthographic projection of the first electrically conductive layer 22 on the substrate 10, and the orthographic projection of the second shadow eliminating layer 32 on the substrate 10 covers the entire orthographic projection of the second electrically conductive layer 34 on the substrate 10.

As shown in FIGS. 1 to 5, the surface area of the side of the first electrically conducting line 221 that is away from the substrate 10 is equal to the surface area of the side of the first shadow eliminating layer 24 inside the groove that faces the substrate 10. As shown in FIGS. 1, 4 and 5, regarding the touch-control panel in which the first electrically conductive layer 22 and the second electrically conductive layer 34 are arranged on the different sides, the surface area of the side of the second shadow eliminating layer 32 inside the groove that is away from the substrate 10 is equal to the surface area of the side of the second electrically conducting line 341 that faces the substrate 10. As shown in FIG. 2, regarding the touch-control panel, in which the first electrically conductive layer 22 and the second electrically conductive layer 34 are arranged on the same side, the surface area of the side of the second shadow eliminating layer 32 inside the groove that faces the substrate 10 is equal to the surface area of the side of the second electrically conducting line 341 that is away from the substrate 10.

Figure 6:
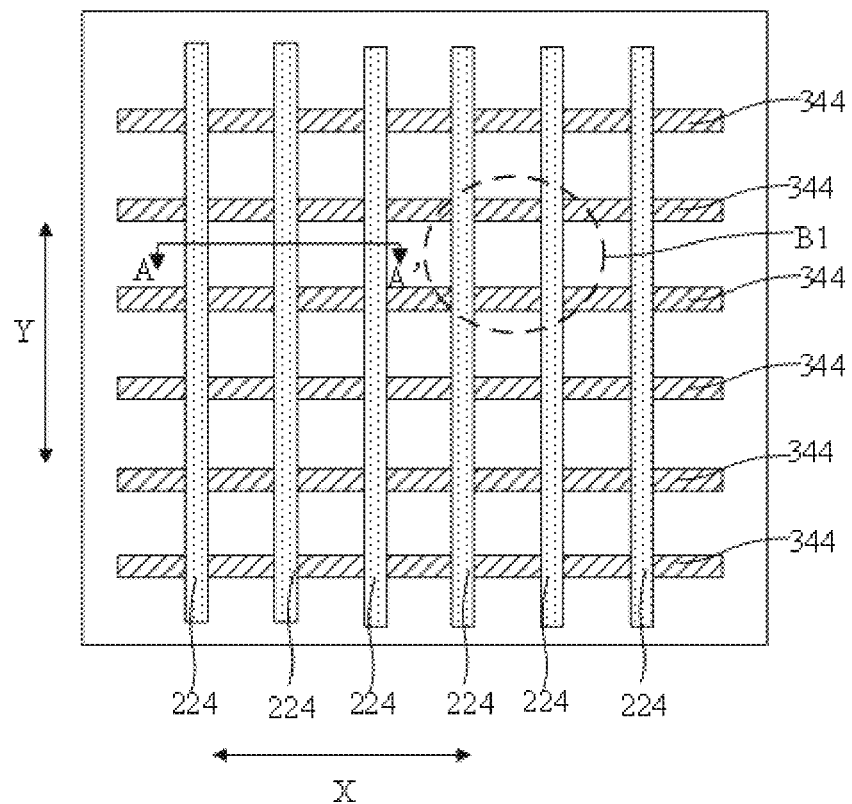
FIG. 6 schematically shows a top view of the touch-control panel according to an embodiment of the present application.

In the practical product, as shown in FIG. 6, the touch-control panel comprises a plurality of first touch-controlling electrodes 224 distributed in a first direction and a plurality of second touch-controlling electrodes 344 distributed in a second direction, to realize the function of touch controlling by using the first touch-controlling electrodes 224 and the second touch-controlling electrodes 344. One of the first touch-controlling electrodes 224 and the second touch-controlling electrodes 344 are touch-controlling driving electrodes, and the other are touch-controlling sensing electrodes.

It should be noted that the sectional view that is obtained along the cross section A-A' in FIG. 6 is the touch-control panel shown in any one of FIGS. 1 to 5. In the practical product, each of the first touch-controlling electrodes 224 and each of the second touch-controlling electrodes 344 are actually of a net-like structure. FIG. 6 merely shows the mode of arrangement of the first touch-controlling electrodes 224 and the second touch-controlling electrodes 344, and an enlarged view of the region BI in FIG. 6 may refer to FIGS. 7 to 13. FIGS. 7 to 13 show the actual net-like structure of the first touch-controlling electrodes 224 and the second touch-controlling electrodes 344. In addition, in FIGS. 6 to 13, the direction X may be comprehended as the second direction, and the direction Y may be comprehended as the first direction.

In an embodiment of the present application, as shown in FIGS. 7 to 13, the plurality of first electrically conducting lines 221 form a plurality of first electrically conducting grids 222, the first electrically conducting lines 221 that correspond to at least some of the plurality of first electrically conducting grids 222 have first notches 223, and the first notches 223 separate the first electrically conductive layer 22 into a plurality of first electrically conducting elements. The plurality of second electrically conducting lines 341 form a plurality of second electrically conducting grids 342, the second electrically conducting lines 341 that correspond to at least some of the plurality of second electrically conducting grids 342 have second notches 343, and the second notches 343 separate the second electrically conductive layer 34 into a plurality of second electrically conducting elements. The plurality of first electrically conducting elements and the plurality of second electrically conducting elements together form a latticed first touch-controlling electrode 224 and a latticed second touch-controlling electrode 344.

In this case, each of the first electrically conducting elements comprises a plurality of first electrically conducting grids 222, each of the second electrically conducting elements comprises a plurality of second electrically conducting grids 342, each of the first electrically conducting grids 222 is a polygon formed by a plurality of first electrically conducting lines 221, and each of the second electrically conducting grids 342 is a polygon formed by a plurality of second electrically conducting lines 341.

For example, the shapes of the first electrically conducting grids 222 and the second electrically conducting grids 342 are a rectangle, a diamond, a triangle, a pentagon, a hexagon and so on.

It should be noted that the first notches 223 are perpendicular to the extension direction of the first electrically conducting line 221 and the direction of the line width of the first electrically conducting line 221, and the second notches 343 are perpendicular to the extension direction of the second electrically conducting line 341 and the direction of the line width of the second electrically conducting line 341. Furthermore, the first notches 223 may be formed when the first accommodating grooves of the first carrier element are being formed by impression, and, subsequently, by directly forming the first electrically conducting lines 221 inside the first accommodating grooves, the first electrically conducting lines 221 having the first notches 223 can be obtained. Alternatively, a whole layer of a first electrically conductive thin film may be deposited after the first carrier element has been formed, and the first electrically conductive thin film may be patterned, to obtain the first electrically conducting lines 221 having the first notches 223. The process of forming the second notches 343 is similar, and is not discussed herein further.

In the practical product, the first electrically conducting grids 222 and the second electrically conducting grids 342 are arranged in stagger; in other words, the first electrically conducting grids 222 do not completely coincide with the second electrically conducting grids 342.

Figure 7:
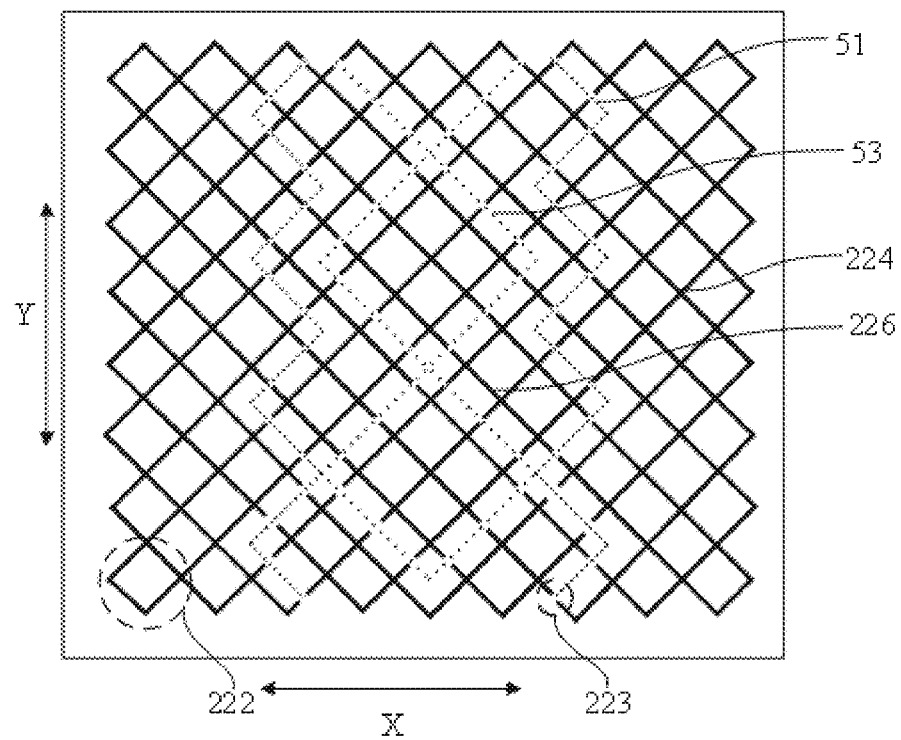
FIG. 7 schematically shows a schematic structural diagram of the first electrically conductive layer according to an embodiment of the present application.
Figure 8:
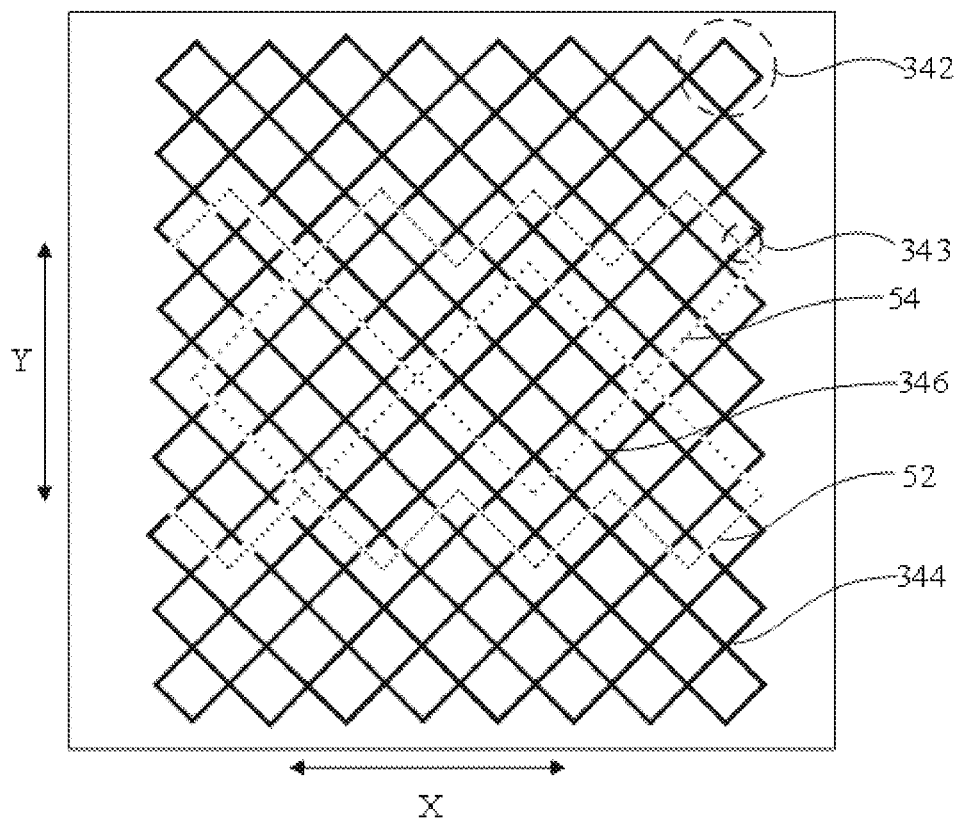
FIG. 8 schematically shows a schematic structural diagram of the second electrically conductive layer according to an embodiment of the present application.
Figure 9:
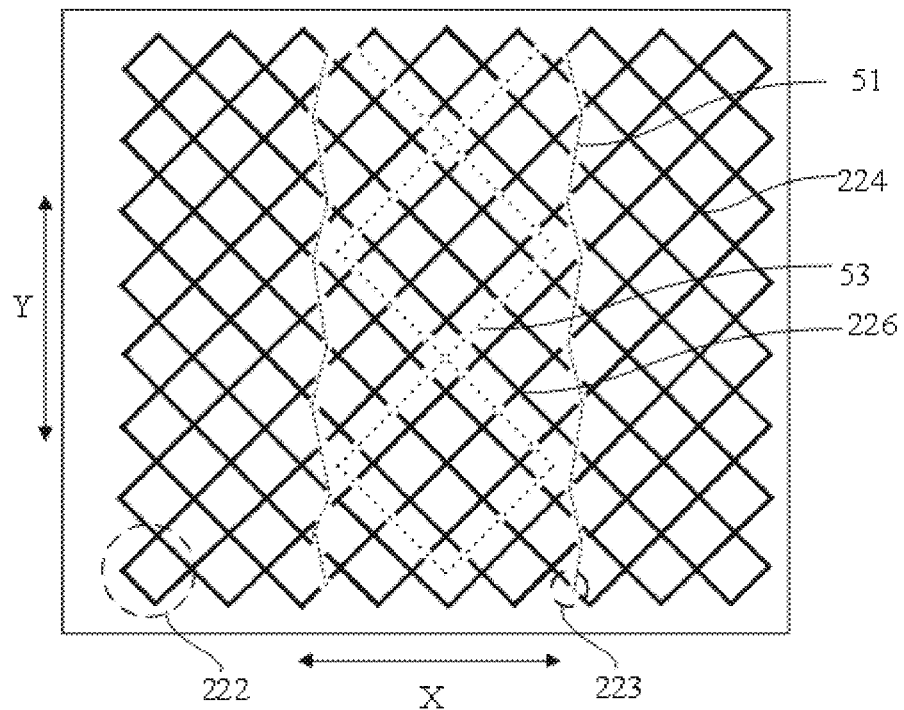
FIG. 9 schematically shows a schematic structural diagram of the first electrically conductive layer according to another embodiment of the present application.
Figure 10:
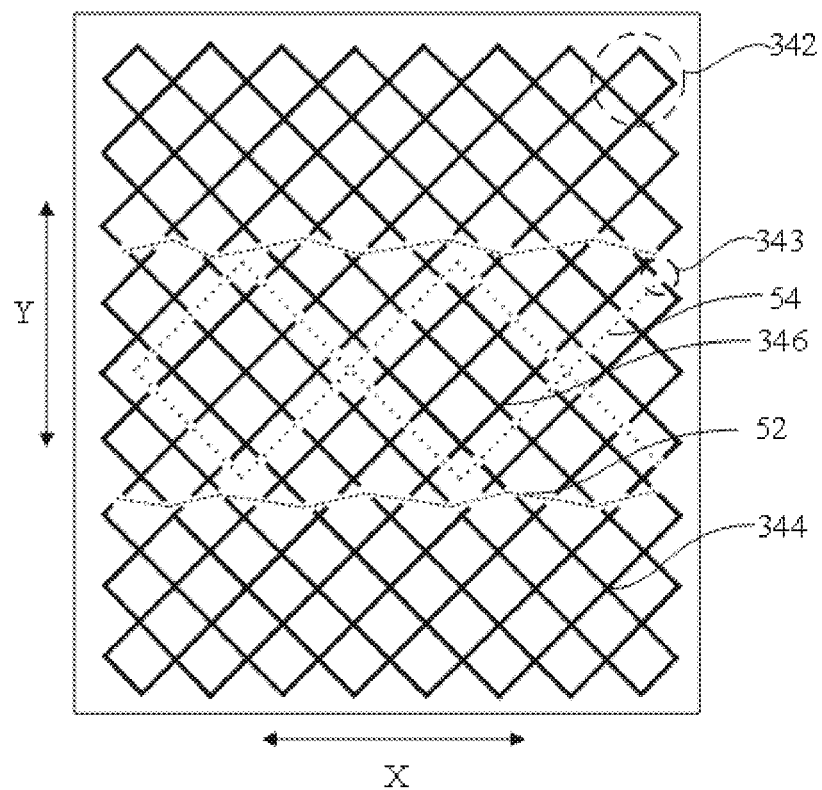
FIG. 10 schematically shows a schematic structural diagram of the second electrically conductive layer according to another embodiment of the present application.

In some embodiments, as shown in FIGS. 7 and 9, the plurality of first electrically conducting elements include a plurality of first touch-controlling electrodes 224 that extend in a first direction, and, as shown in FIGS. 8 and 10, the plurality of second electrically conducting elements include a plurality of second touch-controlling electrodes 344 that extend in a second direction, wherein the first direction intersects with the second direction.

In this case, the first electrically conductive layer 22 comprises a plurality of first touch-controlling electrodes 224 that extend in the first direction, each of the first touch-controlling electrodes 224 comprises a plurality of first electrically conducting grids 222, two neighboring first touch-controlling electrodes 224 are insulated therebetween, and the first electrically conducting grids 222 comprised in each of the first touch-controlling electrodes 224 are interconnected. The second electrically conductive layer 34 comprises a plurality of second touch-controlling electrodes 344 that extend in the second direction, each of the second touch-controlling electrodes 344 comprises a plurality of second electrically conducting grids 342, two neighboring second touch-controlling electrodes 344 are insulated therebetween, and the second electrically conducting grids 342 comprised in each of the second touch-controlling electrodes 344 are interconnected.

For example, the first direction and the second direction are perpendicular to each other, and when the touch-control panel according to the embodiments of the present application is adhered to the display panel, the first direction may be parallel to the column direction of the display panel, and the second direction is parallel to the row direction of the display panel.

In another embodiments, one of the plurality of first electrically conducting elements and the plurality of second electrically conducting elements include a plurality of instances of the first touch-controlling electrode that extend in a first direction and a plurality of electrode main-body parts, and the other include a plurality of bridging electrodes; and each of the bridging electrodes is connected to two neighboring instances of the electrode main-body parts in a second direction by via holes extending throughout a medium layer, to form a plurality of instances of the second touch-controlling electrode that extend in the second direction, wherein the first direction intersects with the second direction. The medium layer is a film layer between the first electrically conductive layer 22 and the second electrically conductive layer 34.

Figure 11:
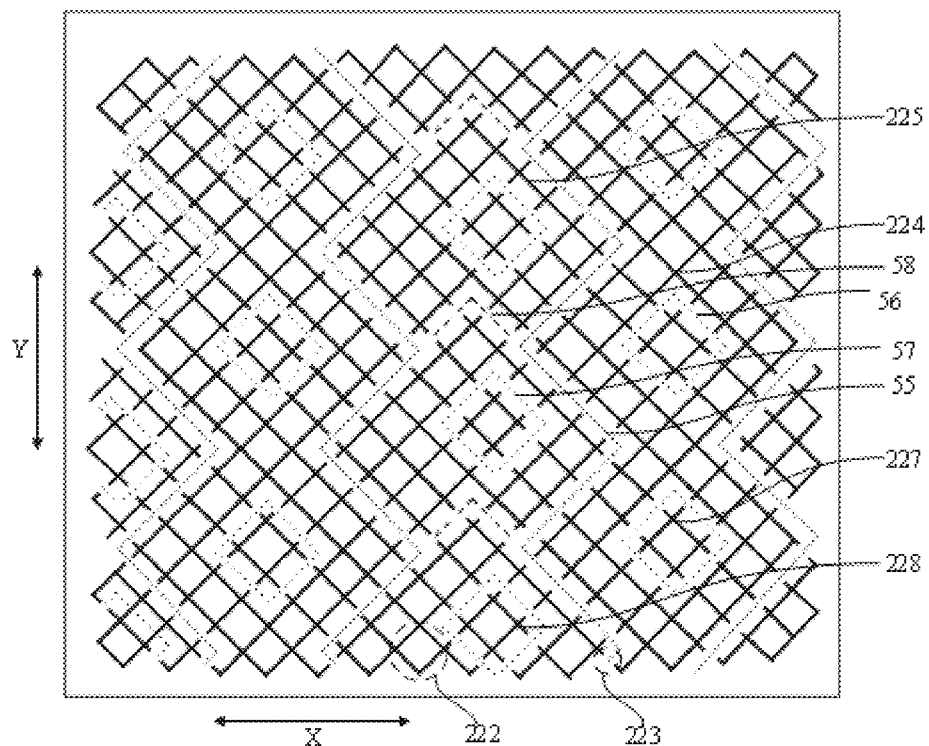
FIG. 11 schematically shows a schematic structural diagram of the first electrically conductive layer according to yet another embodiment of the present application.
Figure 12:
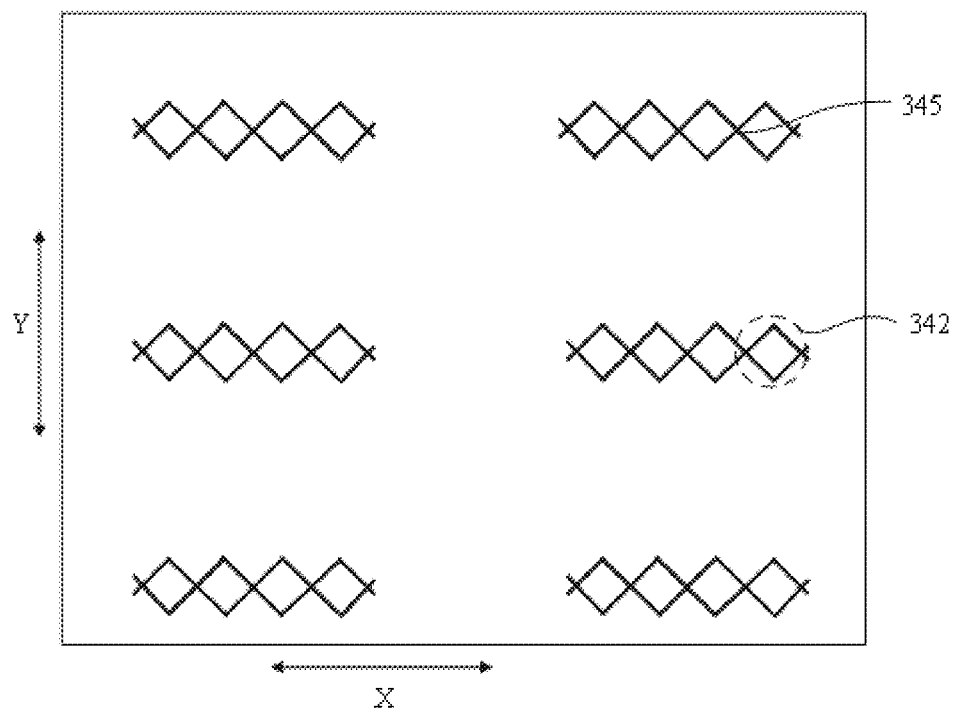
FIG. 12 schematically shows a schematic structural diagram of the second electrically conductive layer according to yet another embodiment of the present application.

In an optional embodiment, as shown in FIG. 11, the plurality of first electrically conducting elements include a plurality of first touch-controlling electrodes 224 that extend in the first direction and a plurality of electrode main-body parts 225. As shown in FIG. 12, the plurality of second electrically conducting elements include a plurality of bridging electrodes 345. In this case, the first electrically conductive layer 22 comprises a plurality of first touch-controlling electrodes 224 that extend in the first direction and a plurality of electrode main-body parts 225, a plurality of electrode main-body parts 225 are provided between two neighboring first touch-controlling electrodes 224, the first touch-controlling electrodes 224 are insulated from the electrode main-body parts 225, the electrode main-body parts 225 are insulated therebetween, and the first electrically conducting grids 222 comprised in each of the first touch-controlling electrodes 224 are interconnected. The second electrically conductive layer 34 comprises a plurality of bridging electrodes 345, each of the bridging electrodes 345 comprises a plurality of second electrically conducting grids 342, and the bridging electrodes 345 are insulated therebetween.

In another optional embodiment, the plurality of first electrically conducting elements include a plurality of bridging electrodes, and the plurality of second electrically conducting elements include a plurality of first touch-controlling electrodes that extend in the first direction and a plurality of electrode main-body parts. In this case, the first electrically conductive layer comprises a plurality of bridging electrodes, each of the bridging electrodes comprises a plurality of first electrically conducting grids, and the bridging electrodes are insulated therebetween. The second electrically conductive layer comprises a plurality of first touch-controlling electrodes that extend in the first direction and a plurality of electrode main-body parts, a plurality of electrode main-body parts are provided between two neighboring first touch-controlling electrodes, the first touch-controlling electrodes are insulated from the electrode main-body parts, the electrode main-body parts are insulated therebetween, and the second electrically conducting grids comprised in each of the first touch-controlling electrodes are interconnected.

Figure 13:
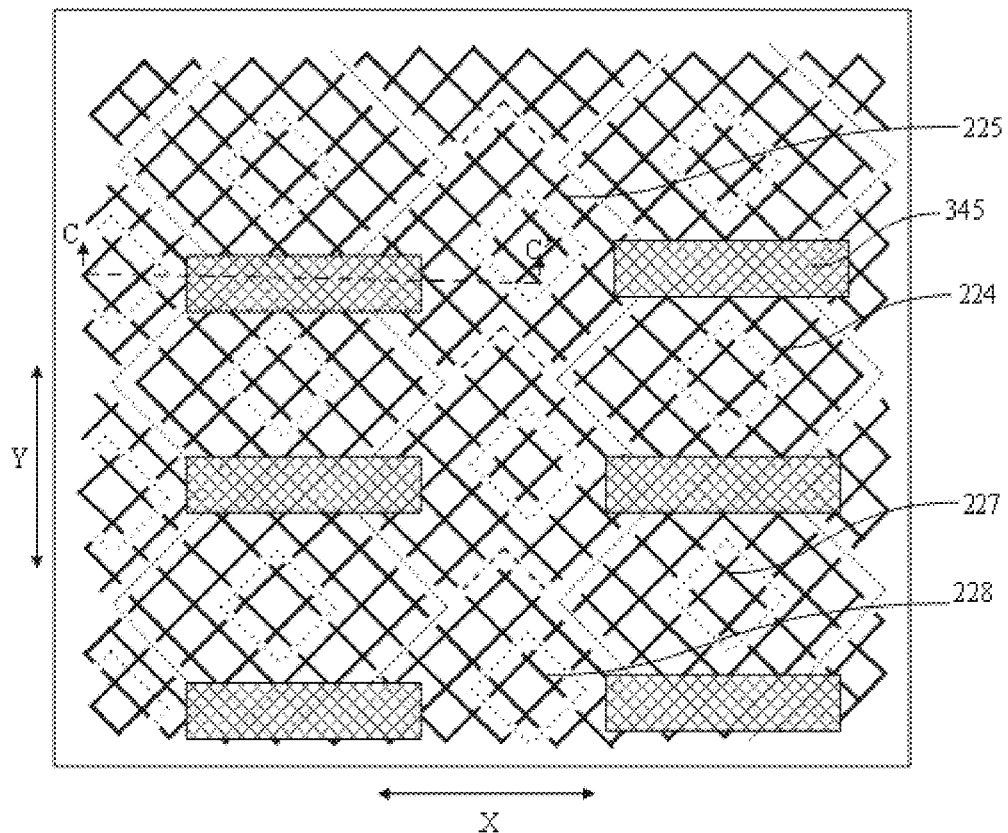
FIG. 13 schematically shows a diagram of the stacking relation between the first electrically conductive layer shown in FIG. 11 and the second electrically conductive layer shown in FIG. 12.
Figure 14:
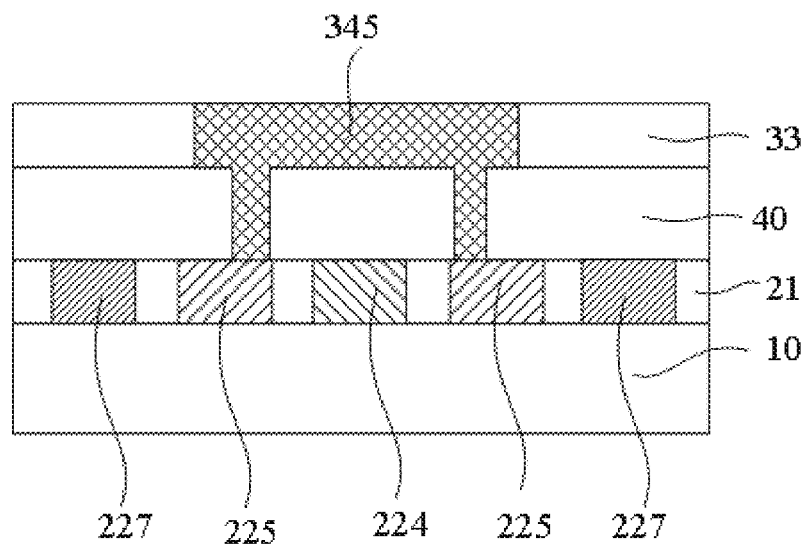
FIG. 14 schematically shows a sectional view of the touch-control panel shown in FIG. 13 along the cross section C-C'.

Furthermore, as shown in FIGS. 13 and 14, each of the bridging electrodes 345 is connected to the two neighboring electrode main-body parts 225 in the second direction by via holes extending throughout the medium layer, to form the plurality of second touch-controlling electrodes 344 that extend in the second direction.

Regarding the touch-control panel shown in FIG. 2, all of the first carrier layer 21, the second carrier layer 23, the fourth carrier layer 31 and the fifth carrier layer 33 are located on the same side of the substrate 10, and the medium layer is the insulating layer 40 and the first shadow eliminating layer 24.

In other words, regarding the touch-control panel in which the first electrically conductive layer 22 and the second electrically conductive layer 34 are arranged on the same side, each of the bridging electrodes 345 is connected to the two neighboring electrode main-body parts 225 in the second direction by via holes extending throughout the insulating layer 40 and the first shadow eliminating layer 24.

It should be noted that the sectional view obtained along the cross section C-C' shown in FIG. 13 is shown in FIG. 14. FIG. 14 does not show the layer structure of the second carrier layer 23, the fourth carrier layer 31, the first shadow eliminating layer 24 and the second shadow eliminating layer 32, and merely demonstrates the connection relation between the bridging electrodes 345 and electrode main-body parts 225, and the actual sectional view of the touch-control panel may refer to FIG. 2.

It should be noted that, regarding the touch-control panel in which the first electrically conductive layer 22 and the second electrically conductive layer 34 are arranged on the different sides, if the connection between the bridging electrodes on one side of the substrate 10 and the electrode main-body parts on the other side is to be realized, it is required to form via holes extending throughout the substrate 10, however the substrate 10 has a high thickness, the formation of the via holes cannot be easily realized. Therefore, in order to facilitate the manufacture, the mode according to the embodiments of the present application in which the second touch-controlling electrode is formed by connecting the bridging electrode and the electrode main-body part is mainly suitable for the touch-control panel in which the first electrically conductive layer 22 and the second electrically conductive layer 34 are arranged on the same side. In addition, the bridging electrode 345 in FIG. 13 merely shows the position of the bridging electrode, and the actual shape of the bridging electrodes 345 are shown in FIG. 12.

Optionally, the line width of the first electrically conducting lines 221 is less than or equal to the line width of the second electrically conducting lines 341.

As shown in FIGS. 1 to 4, the line width d1 of the first electrically conducting lines 221 is equal to the line width d2 of the second electrically conducting lines 341. As shown in FIG. 5, the line width d2 of the second electrically conducting lines 341 is greater than the line width d1 of the first electrically conducting lines 221.

If the line width of the first electrically conducting lines 221 and the line width of the second electrically conducting lines 341 are set to be equal, it can ameliorate the generation of moire patterns, to improve the optical property of the product. Moreover, if, as in FIG. 5, the line width d2 of the second electrically conducting lines 341 is set to be greater than the line width d1 of the first electrically conducting lines 221, it can increase the contact area between the second electrically conductive layer 34 and the second shadow eliminating layer 32, whereby the second electrically conductive layer 34 does not easily peel.

It should be noted that the line width d1 of the first electrically conducting lines 221 refers to the line width at the surface of the first electrically conducting line 221 that contacts the first shadow eliminating layer 24, and the line width d2 of the second electrically conducting lines 341 refers to the line width at the surface of the second electrically conducting line 341 that contacts the second shadow eliminating layer 32.

In an embodiment of the present application, both of the material of the first carrier element and the material of the second carrier element are a photo-solidified adhesive, for example, an ultraviolet photo-solidified adhesive.

As shown in FIGS. 1 and 2, all of the materials of the first carrier layer 21, the second carrier layer 23, the fourth carrier layer 31 and the fifth carrier layer 33 are a photo-solidified adhesive, and the thicknesses of the first carrier layer 21, the second carrier layer 23, the fourth carrier layer 31 and the fifth carrier layer 33 are 10 μm to 50 μm.

Optionally, the thicknesses of the first carrier layer 21, the second carrier layer 23, the fourth carrier layer 31 and the fifth carrier layer 33 are equal. For example, each of the thicknesses of the first carrier layer 21, the second carrier layer 23, the fourth carrier layer 31 and the fifth carrier layer 33 may be 10 μm, 20 μm, 30 μm, 40 μm, 50 μm and so on.

Moreover, as shown in FIGS. 3 to 5, the materials of the third carrier layer 25 and the sixth carrier layer 35 are also a photo-solidified adhesive.

Certainly, the materials of the first carrier element and the second carrier element may also be another adhesive-type material having a certain supporting strength, and are not limited to the photo-solidified adhesive described above.

In an embodiment of the present application, both of the first shadow eliminating layer 24 and the second shadow eliminating layer 32 are a light shielding ink layer or a light shielding oxide layer, and the transmittance of the first shadow eliminating layer 24 and the transmittance of the second shadow eliminating layer 32 are less than or equal to 10%.

For example, the light shielding ink layer is a black ink layer, and the light shielding oxide layer is a black oxide layer, for example, molybdenum oxide.

In an embodiment of the present application, the first electrically conductive layer 22 and the second electrically conductive layer 34 are an electrically conductive silver-paste layer; or the material of the first electrically conductive layer 22 and the material of the second electrically conductive layer 34 are at least one of copper, molybdenum, aluminum and titanium.

Particularly, the first electrically conductive layer 22 and the second electrically conductive layer 34 may be of a single-layer structure, for example, a copper metal layer. The first electrically conductive layer 22 and the second electrically conductive layer 34 may also be of a three-layer structure, which comprises a molybdenum metal layer, an aluminum metal layer and a molybdenum metal layer that are arranged sequentially in stack, or comprises a titanium metal layer, an aluminum metal layer and a titanium metal layer that are arranged sequentially in stack.

In an embodiment of the present application, the sum between the thickness of the first electrically conductive layer 22 and the thickness of the first shadow eliminating layer 24 is equal to the thickness of the first carrier element, and the sum between the thickness of the second electrically conductive layer 34 and the thickness of the second shadow eliminating layer 32 is equal to the thickness of the second carrier element.

As shown in FIGS. 1 and 2, the sum between the thicknesses of the first electrically conductive layer 22 and the first shadow eliminating layer 24 is equal to the sum between the thicknesses of the first carrier layer 21 and the second carrier layer 23. Particularly, the thickness of the first electrically conductive layer 22 is equal to the thickness of the first carrier layer 21, whereby the surface of the side of the first electrically conductive layer 22 that is away from the substrate 10 and the surface of the side of the first carrier layer 21 that is away from the substrate 10 are located in the same plane, and the thickness of the first shadow eliminating layer 24 is equal to the thickness of the second carrier layer 23, whereby the surface of the side of the first shadow eliminating layer 24 that is away from the substrate 10 and the surface of the side of the second carrier layer 23 that is away from the substrate 10 are located in the same plane. Furthermore, the sum between the thicknesses of the second electrically conductive layer 34 and the second shadow eliminating layer 32 is equal to the sum between the thicknesses of the fourth carrier layer 31 and the fifth carrier layer 33. Particularly, the thickness of the second shadow eliminating layer 32 is equal to the thickness of the fourth carrier layer 31, whereby the surface of the side of the second shadow eliminating layer 32 that is away from the substrate 10 and the surface of the fourth carrier layer 31 that is away from the substrate 10 are located in the same plane, and the thickness of the second electrically conductive layer 34 is equal to the thickness of the fifth carrier layer 33, whereby the surface of the side of the second electrically conductive layer 34 that is away from the substrate 10 and the surface of the side of the fifth carrier layer 33 that is away from the substrate 10 are located in the same plane.

As shown in FIGS. 3 to 5, the sum between the thicknesses of the first electrically conductive layer 22 and the first shadow eliminating layer 24 is equal to the thickness of the third carrier layer 25, whereby the surface of the side of the first shadow eliminating layer 24 that is away from the substrate 10 and the surface of the side of the third carrier layer 25 that is away from the substrate 10 are located in the same plane, moreover, as shown in FIGS. 4 and 5, the sum between the thicknesses of the second electrically conductive layer 34 and the second shadow eliminating layer 32 is equal to the thickness of the sixth carrier layer 35, whereby the surface of the side of the second electrically conductive layer 34 that is away from the substrate 10 and the surface of the side of the sixth carrier layer 35 that is away from the substrate 10 are located in the same plane.

Certainly, it can be understood that, regarding the touch-control panel shown in FIG. 3, the thickness of the second electrically conductive layer 34 is equal to the thickness of the sixth carrier layer 35, whereby the surface of the side of the second electrically conductive layer 34 that is away from the substrate 10 and the surface of the side of the sixth carrier layer 35 that is away from the substrate 10 are located in the same plane.

It should be noted that that the thicknesses are equal, as described above, refers to that the thicknesses are substantially equal, and that two surfaces are located in the same plane refers to that the two surfaces substantially flush, both of which allow variations within the ranges of permissible process errors.

As shown in FIGS. 7 and 9, the plurality of first electrically conducting elements further include a plurality of first leisure electrodes 226 provided between two neighboring first touch-controlling electrodes 224, each of the first leisure electrodes 226 is insulated from the first touch-controlling electrodes 224 by the first notches 223. As shown in FIGS. 8 and 10, the plurality of second electrically conducting elements further include a plurality of second leisure electrodes 346 provided between two neighboring second touch-controlling electrodes 344, and each of the second leisure electrodes 346 is insulated from the second touch-controlling electrodes 344 by the second notches 343.

In this case, the touch-control panel comprises a plurality of touch-controlling units that are distributed in an array. The dimension of each of the touch-controlling units in the first direction is b, and the dimension of each of the touch-controlling units in the second direction is a. Because when a finger is pressing the touch-control panel, the dimensions of the finger and the touch-control panel in the first direction and in the second direction are approximately 4.2 mm, in order to better identify the touch-controlling position, both of a and b are required to be set to be less than or equal to 4.2 mm. Each of the touch-controlling units comprises a first touch-controlling electrode, a second touch-controlling electrode and a leisure electrode. For example, the first touch-controlling electrode extending in the first direction is a touch-controlling driving electrode, and the second touch-controlling electrode extending in the second direction is a touch-controlling sensing electrode. Accordingly, the width of each of the touch-controlling driving electrodes in the second direction is 0.75a-0.99a, the width of each of the touch-controlling sensing electrodes in the first direction is 0.5b-0.75b, and the remaining area is the positions of the leisure electrodes. By reasonably setting the sizes of the touch-controlling driving electrodes, the touch-controlling sensing electrodes and the leisure electrodes, the detection on the touch-controlling position can be more accurate.

Particularly, the leisure electrodes include a plurality of first leisure electrodes 226 located between two neighboring first touch-controlling electrodes 224, and a plurality of second leisure electrodes 346 located between two neighboring second touch-controlling electrodes 344, the first leisure electrodes 226 are located at the first electrically conductive layer 22, and the second leisure electrodes 346 are located at the second electrically conductive layer 34.

It should be noted that the first leisure electrodes 226 and the second leisure electrodes 346 do not serve to transmit and sense the touch-controlling signals. In an aspect, the purpose of providing the first leisure electrodes 226 in the first electrically conductive layer 22 and providing the second leisure electrodes 346 in the second electrically conductive layer 34 is to balance the visual effect, to prevent the generation of moire patterns caused by optical interference in the area where no first touch-controlling electrode 224 and second touch-controlling electrode 344 are provided. In another aspect, the provision of the first leisure electrodes 226 can enable the spacing between two neighboring first touch-controlling electrodes 224 to be increased, to prevent mutual influence between the two neighboring first touch-controlling electrodes 224, and, correspondingly, the provision of the second leisure electrodes 346 can enable the spacing between two neighboring second touch-controlling electrodes 344 to be increased, to prevent mutual influence between the two neighboring second touch-controlling electrodes 344.

Moreover, in order to prevent short circuit between neighboring first touch-controlling electrodes 224, it is required to insulate each of the first leisure electrodes 226 from the first touch-controlling electrodes 224 by the first notches 223. Correspondingly, in order to prevent short circuit between neighboring second touch-controlling electrodes 344, it is required to insulate each of the second leisure electrodes 346 from the second touch-controlling electrodes 344 by the second notches 343.

Optionally, between the first leisure electrodes 226 and the first touch-controlling electrodes 224, the extension direction of a first trajectory line 51 formed by any at least two neighboring first notches 223 intersects with the first direction, and the extension directions of any two neighboring first trajectory lines 51 intersect. The first trajectory line 51 is a straight line segment formed by at least two neighboring first notches 223 between the first leisure electrodes 226 and the first touch-controlling electrodes 224, and the first electrically conducting line 221 where the first notch 223 closest to the starting of the first trajectory line 51 is located are in parallel with the first electrically conducting line 221 where the first notch 223 closest to the ending of the first trajectory line 51 is located. Between the second leisure electrodes 346 and the second touch-controlling electrodes 344, the extension direction of a second trajectory line 52 formed by any at least two neighboring second notches 343 intersects with the second direction, and the extension directions of any two neighboring second trajectory lines 52 intersect. The second trajectory line 52 is a straight line segment formed by at least two neighboring second notches 343 between the second leisure electrodes 346 and the second touch-controlling electrodes 344, and the second electrically conducting line 341 where the second notch 343 closest to the starting of the second trajectory line 52 is located are in parallel with the second electrically conducting line 341 where the second notch 343 closest to the ending of the second trajectory line 52 is located.

In this case, the straight line segment formed by at least two neighboring first notches 223 between the first leisure electrodes 226 and the first touch-controlling electrodes 224 is referred to as the first trajectory line 51, and the straight line segment formed by at least two neighboring second notches 343 between the second leisure electrodes 346 and the second touch-controlling electrodes 344 is referred to as the second trajectory line 52. As shown in FIG. 7, two neighboring first notches 223 between the first leisure electrodes 226 and the first touch-controlling electrodes 224 form the first trajectory line 51. As shown in FIG. 9, three neighboring first notches 223 between the first leisure electrodes 226 and the first touch-controlling electrodes 224 form the first trajectory line 51. Certainly, the first trajectory line 51 may also be formed by four or five neighboring first notches 223 between the first leisure electrodes 226 and the first touch-controlling electrodes 224. Correspondingly, as shown in FIG. 8, two neighboring second notches 343 between the second leisure electrodes 346 and the second touch-controlling electrodes 344 form the second trajectory line 52. As shown in FIG. 10, three neighboring second notches 343 between the second leisure electrodes 346 and the second touch-controlling electrodes 344 form the second trajectory line 52. Certainly, the second trajectory line 52 may also be formed by four or five neighboring second notches 343 between the second leisure electrodes 346 and the second touch-controlling electrodes 344. The quantity of the notches required by forming one trajectory line is not limited in the embodiments of the present application.

The extension direction of each of the first trajectory lines 51 intersects with the first direction, and the extension directions of any two neighboring first trajectory lines 51 are intersected. Therefore, the combination of the first trajectory lines 51 between each of the first touch-controlling electrodes 224 and the first leisure electrodes 226 is not a straight line in the first direction. Correspondingly, the extension direction of each of the second trajectory lines 52 intersects with the second direction, and the extension directions of any two neighboring second trajectory lines 52 are intersected. Therefore, the combination of the second trajectory lines 52 between each of the second touch-controlling electrodes 344 and the second leisure electrodes 346 is not a straight line in the second direction.

However, in the related art, all of the first trajectory lines between the first touch-controlling electrodes and the first leisure electrodes are straight line segments that are in parallel with the first direction and extend in the first direction, and obvious and regular fringes can be seen under intensive-light reflection, which exhibits the characteristic of alternate lightness and darkness. Moreover, all of the second trajectory lines between the second touch-controlling electrodes and the second leisure electrodes are straight line segments that are in parallel with the second direction and extend in the second direction, and obvious and regular fringes can be seen under intensive-light reflection, which exhibits the characteristic of alternate lightness and darkness. Therefore, in the embodiments of the present application, by configuring that the first trajectory lines 51 intersect with the first direction, and the extension directions of any two neighboring first trajectory lines 51 are intersected, the first notches 223 between the first touch-controlling electrodes 224 and the first leisure electrodes 226 can exhibit an irregular and randomized design. Furthermore, by configuring that the second trajectory lines 52 intersect with the second direction, and the extension directions of any two neighboring second trajectory lines 52 are intersected, the second notches 343 between the second touch-controlling electrodes 344 and the second leisure electrodes 346 can also exhibit an irregular and randomized design. Accordingly, obvious and regular fringes under intensive-light reflection are prevented, to improve the optical property of the product.

In FIG. 7, in each of the first trajectory lines 51, each of the first notches 223 is located at the position of ½ of the first electrically conducting lines 221 in the first electrically conducting grids 222, and the first electrically conducting lines 221, where two first notches 223 in each of the first trajectory lines 51 are located, are in parallel with each other. In this case, the two first notches 223 in each of the first trajectory lines 51 refer to the first notch 223 closest to the starting of the first trajectory line 51 and the first notch 223 closest to the ending of the first trajectory line 51. Moreover, the included angle between the extension directions of two neighboring first trajectory lines 51 is actually 90°.

Correspondingly, in FIG. 8, in each of the second trajectory lines 52, each of the second notches 343 is located at the position of ½ of the second electrically conducting lines 341 in the second electrically conducting grids 342, and the first electrically conducting lines 221, where two second notches 343 in each of the second trajectory lines 52 are located, are in parallel with each other. In this case, the two second notches 343 in each of the second trajectory lines 52 refer to the second notch 343 closest to the starting of the second trajectory line 52 and the second notch 343 closest to the ending of the second trajectory line 52. Moreover, the included angle between the extension directions of two neighboring second trajectory lines 52 is actually 90°.

Moreover, in FIG. 9, in each of the first trajectory lines 51, the three first notches 223 are located at the position of ¾, the position of ½ and the position of ¼ of the first electrically conducting lines 221 in different first electrically conducting grids 222. Furthermore, in the same first trajectory line 51, the first electrically conducting line 221 where the first notch 223 located at the position of ½ is located intersects with individually the first electrically conducting line 221 where the first notch 223 located at the position of ¾ is Located and the First Electrically Conducting Line 221 where the first notch 223 located at the position of ¼ is Located, and the First Electrically conducting line 221 where the first notch 223 located at the position of ¾ is located are in parallel with the first electrically conducting line 221 where the first notch 223 located at the position of ¼ is located. In this case, in each of the first trajectory lines 51, the first notch 223 located at the position of ¾ and the First Notch 223 Located at the Position of ¼ Respectively Refer to the First Notch 223 closest to the starting of the first trajectory line 51 and the first notch 223 closest to the ending of the first trajectory line 51. Moreover, the included angle between the extension directions of two neighboring first trajectory lines 51 is an obtuse angle.

Correspondingly, in FIG. 10, in each of the second trajectory lines 52, the three second notches 343 are located at the position of ¾, the Position of ½ and the Position of ¼ of the Second electrically conducting lines 341 in different second electrically conducting grids 342. Furthermore, in the same second trajectory line 52, the second electrically conducting line 341 where the second notch 343 located at the position of ½ is located intersects with individually the second electrically conducting line 341 where the second notch 343 located at the position of ¾ is located and the second electrically conducting line 341 where the second notch 343 located at the position of ¼ is located, and the second electrically conducting line 341 where the second notch 343 located at the position of ¾ is Located are in Parallel with the Second Electrically Conducting Line 341 where the second notch 343 located at the position of ¼ is located. In this case, in each of the second trajectory lines 52, the second notch 343 located at the position of ¾ and the second notch 343 located at the position of ¼ respectively refer to the second notch 343 closest to the starting of the second trajectory line 52 and the second notch 343 closest to the ending of the second trajectory line 52. Moreover, the included angle between the extension directions of two neighboring second trajectory lines 52 is an obtuse angle.

It should be noted that the mode of delimiting the first notches 223 and the second notches 343 according to the embodiments of the present application is not limited to the two modes described above. The first electrically conducting line 221 in each of the first electrically conducting grids 222 may also be delimited into N equal parts, the first notch 223 is located at the position of x/N, wherein N is a positive integer greater than 2, and x is a positive integer less than N, and it is merely required that the combination of all of the first trajectory lines 51 formed by the first notches 223 between the first leisure electrodes 226 and the first touch-controlling electrodes 224 is not a straight line. The mode of delimiting the second notches 343 is similar, whereby the combination of all of the second trajectory lines 52 formed by the second notches 343 between the second leisure electrodes 346 and the second touch-controlling electrodes 344 is not a straight line either.

In addition, in the practical product, the first trajectory lines 51 and the second trajectory lines 52 do not exist, and the illustration in the drawings of the first trajectory lines 51 and the second trajectory lines 52 is merely for the purpose of facilitating the observation on the rule of the distribution of the first notches 223 and the second notches 343. Furthermore, in order to facilitate the observation on the rule of two neighboring first trajectory lines 51, two neighboring first trajectory lines 51 are connected together. Correspondingly, in order to facilitate the observation on the rule of two neighboring second trajectory lines 52, two neighboring second trajectory lines 52 are connected together.

Optionally, as shown in FIGS. 7 and 9, each of the first leisure electrodes 226 is separate from the neighboring first leisure electrodes 226 by a third trajectory line 53 formed by the first notches 223, the third trajectory line 53 is a straight line segment formed by at least two neighboring first notches 223 between two first leisure electrodes 226, and the first electrically conducting line 221 where the first notch 223 closest to the starting of the third trajectory line 53 is located are in parallel with the first electrically conducting line 221 where the first notch 223 closest to the ending of the third trajectory line 53 is located. As shown in FIGS. 8 and 10, each of the second leisure electrodes 346 is separate from the neighboring second leisure electrodes 346 by a fourth trajectory line 54 formed by the second notches 343, the fourth trajectory line 54 is a straight line segment formed by at least two neighboring second notches 343 between two second leisure electrodes 346, and the second electrically conducting line 341 where the second notch 343 closest to the starting of the fourth trajectory line 54 is located are in parallel with the second electrically conducting line 341 where the second notch 343 closest to the ending of the fourth trajectory line 54 is located.

Particularly, the extension direction of the third trajectory line 53 intersects with the first direction, and the extension directions of any two neighboring third trajectory lines 53 are intersected. Correspondingly, the extension direction of the fourth trajectory line 54 intersects with the second direction, and the extension directions of any two neighboring fourth trajectory lines 54 are intersected.

As shown in FIGS. 7 and 9, the straight line segment formed by three neighboring first notches 223 between two first leisure electrodes 226 is referred to as the third trajectory line 53. As shown in FIGS. 8 and 10, the straight line segment formed by three neighboring second notches 343 between two second leisure electrodes 346 is referred to as the fourth trajectory line 54.

As shown in FIGS. 7 and 9, at least some of the first leisure electrodes 226 in all of the first leisure electrodes 226 comprise at least one closed first electrically conducting grid 222. As shown in FIGS. 8 and 10, at least some of the second leisure electrodes 346 in all of the second leisure electrodes 346 comprise at least one closed second electrically conducting grid 342.

In the related art, notches also exist inside the first leisure electrodes and the second leisure electrodes. The notches have a high density, so that the first leisure electrodes do not comprise an intact first electrically conducting grid, and the second leisure electrodes do not comprise an intact second electrically conducting grid either, whereby light-and-dark fringes easily emerge under intensive-light reflection. However, in the embodiments of the present application, by changing the configuration of the notches inside the first leisure electrodes 226 and the second leisure electrodes 346, at least some of the first leisure electrodes 226 can comprise at least one closed first electrically conducting grid 22, and at least some of the second leisure electrodes 346 can comprise at least one closed second electrically conducting grid 342, thereby reducing the density of the notches inside the first leisure electrodes 226 and the second leisure electrodes 346, to reduce the light-and-dark fringes emerging under intensive-light reflection.

As shown in FIG. 11, the plurality of first electrically conducting elements or the plurality of second electrically conducting elements further include a plurality of third leisure electrodes 227 and a plurality of fourth leisure electrodes 228, and each of the third leisure electrodes 227 and each of the fourth leisure electrodes 228 are provided in the same layer as the first touch-controlling electrodes 224 and the electrode main-body parts 225. Each of the third leisure electrodes 227 is located within the region enclosed by the first touch-controlling electrodes 224, and each of the third leisure electrodes 227 is insulated from the first touch-controlling electrodes 224 by target notches. Each of the fourth leisure electrodes 228 is located within the region enclosed by the electrode main-body parts 225, and each of the fourth leisure electrodes 228 is insulated from the electrode main-body parts 225 by the target notches. The first touch-controlling electrodes 224 and the electrode main-body parts 225 are insulated by the target notches, and two neighboring electrode main-body parts 225 in the first direction are insulated by the target notches. The target notches are the first notches 223 or the second notches 343.

Particularly, when the plurality of first electrically conducting elements include a plurality of first touch-controlling electrodes 224 that extend in the first direction and a plurality of electrode main-body parts 225, and the plurality of second electrically conducting elements include a plurality of bridging electrodes 345, the plurality of first electrically conducting elements further include the third leisure electrodes 227 and the fourth leisure electrodes 228, in which case the target notches are the first notches 223. Moreover, when the plurality of first electrically conducting elements include a plurality of bridging electrodes, and the plurality of second electrically conducting elements include a plurality of first touch-controlling electrodes that extend in the first direction and a plurality of electrode main-body parts, the plurality of second electrically conducting elements further include the third leisure electrodes 227 and the fourth leisure electrodes 228, in which case the target notches are the second notches 343.

By providing the third leisure electrodes 227 within the region enclosed by the first touch-controlling electrodes 224, and providing the fourth leisure electrodes 228 within the region enclosed by the electrode main-body parts 225, the third leisure electrodes 227 and the fourth leisure electrodes 228 can block or lead away some of the electric field lines generated by the touch-controlling driving electrodes, thereby reducing the electric field lines received by the touch-controlling sensing electrodes, whereby the reference capacitance between the touch-controlling driving electrodes and the touch-controlling sensing electrodes is reduced, and correspondingly the proportion of the amount of the capacitance changing caused by finger touching in the reference capacitance can be increased, thereby improving the touch-controlling sensitivity of the touch-control panel and the accuracy of the detection result.

Optionally, between the first touch-controlling electrodes 224 and the electrode main-body parts 225, the extension direction of a fifth trajectory line 55 formed by any at least two neighboring target notches intersects with the first direction, and the extension directions of any two neighboring fifth trajectory lines 55 intersect. The fifth trajectory line 55 is a straight line segment formed by at least two neighboring target notches between the first touch-controlling electrodes 224 and the electrode main-body parts 225, and the target electrically conducting line, where the target notch closest to the starting of the fifth trajectory line 55 is located, is in parallel with the target electrically conducting line where the target notch closest to the ending of the fifth trajectory line 55 is located. The target electrically conducting line is the first electrically conducting line 221 or the second electrically conducting line 341.

In this case, the straight line segment formed by at least two neighboring target notches between the first leisure electrodes 226 and the electrode main-body parts 225 is referred to as the fifth trajectory line 55. The target notches are the first notches 223 or the second notches 343. When the target notches are the first notches 223, the target electrically conducting line is the first electrically conducting line 221. When the target notches are the second notches 343, the target electrically conducting line is the second electrically conducting line 341. As shown in FIG. 11, four neighboring first notches 223 form the fifth trajectory line 55.

The extension direction of each of the fifth trajectory lines 55 intersects with the first direction, and the extension directions of any two neighboring fifth trajectory lines 55 are intersected. Therefore, the combination of the fifth trajectory lines 55 between each of the first touch-controlling electrodes 224 and the electrode main-body parts 225 is not a straight line in the first direction, whereby the target notches between the first touch-controlling electrodes 224 and the electrode main-body parts 225 exhibit an irregular and randomized design, accordingly, obvious and regular fringes under intensive-light reflection are prevented, to improve the optical property of the product.

In FIG. 11, each of the first notches 223 is located at the position of ½ of the first electrically conducting lines 221 in the first electrically conducting grids 222, and the first electrically conducting lines 221, where four first notches 223 in each of the fifth trajectory lines 55 are located, are in parallel with each other. The included angle between the extension directions of two neighboring fifth trajectory lines 55 is 90°.

In addition, taking the case as an example in which the first touch-controlling electrodes 224 and the plurality of electrode main-body parts 225 are located at the first electrically conductive layer 22 and the bridging electrodes 345 are located at the second electrically conductive layer 34, in FIG. 11, each of the third leisure electrodes 227 is separate from the first touch-controlling electrodes 224 by a sixth trajectory line 56 formed by the first notches 223, the sixth trajectory line 56 is a straight line segment formed by at least two neighboring first notches 223 between the third leisure electrodes 227 and the first touch-controlling electrodes 224, and the first electrically conducting line 221, where the first notch 223 closest to the starting of the sixth trajectory line 56 is located, is in parallel with the first electrically conducting line 221 where the first notch 223 closest to the ending of the sixth trajectory line 56 is located. Correspondingly, each of the fourth leisure electrodes 228 is separate from the electrode main-body parts 225 by a seventh trajectory line 57 formed by the first notches 223, the seventh trajectory line 57 is a straight line segment formed by at least two neighboring first notches 223 between the fourth leisure electrodes 228 and the electrode main-body parts 225, and the first electrically conducting line 221, where the first notch 223 closest to the starting of the seventh trajectory line 57 is located, is in parallel with the first electrically conducting line 221 where the first notch 223 closest to the ending of the seventh trajectory line 57 is located. Each of the electrode main-body parts 225 is separate from its neighboring electrode main-body parts 225 by an eighth trajectory line 58 formed by the first notches 223, the eighth trajectory line 58 is a straight line segment formed by at least two neighboring first notches 223 between two electrode main-body parts 225, and the first electrically conducting line 221, where the first notch 223 closest to the starting of the eighth trajectory line 58 is located, is in parallel with the first electrically conducting line 221 where the first notch 223 closest to the ending of the eighth trajectory line 58 is located.

It should be noted that the parallel as used herein refers to substantially parallel, and the perpendicular as used herein refers to substantially perpendicular, both of which allow variations within the ranges of permissible process errors.

Optionally, at least some of the third leisure electrodes 227 in all of the third leisure electrodes 227 comprise at least one closed target electrically conducting grid; and at least some of the fourth leisure electrodes 228 in all of the fourth leisure electrodes 228 comprise at least one closed target electrically conducting grid, wherein the target electrically conducting grid is the first electrically conducting grids 222 or the second electrically conducting grids 342.

When the plurality of first electrically conducting elements include the third leisure electrodes 227 and the fourth leisure electrodes 228, the target electrically conducting grid is the first electrically conducting grids 222. Moreover, when the plurality of second electrically conducting elements include the third leisure electrodes 227 and the fourth leisure electrodes 228, the target electrically conducting grid is the second electrically conducting grids 342.

By reasonably configuring the target notches between the third leisure electrodes 227 and the first touch-controlling electrodes 224, and the target notches between the fourth leisure electrodes 228 and the electrode main-body parts 225, at least some of the third leisure electrodes 227 and at least some of the fourth leisure electrodes 228 can comprise at least one closed target electrically conducting grid, thereby reducing the density of the notches inside the third leisure electrodes 227 and the fourth leisure electrodes 228, to reduce the light-and-dark fringes emerging under intensive-light reflection.

In the embodiment of the present application, by providing the first carrier element, the first electrically conductive layer and the first shadow eliminating layer on the substrate, by blocking the first electrically conductive layer by using the first shadow eliminating layer, the reflectivity of the first electrically conductive layer is reduced, which reduces the pattern of the first electrically conductive layer being observed under intensive-light reflection, to improve the visual effect of the product.

In the embodiments of the present application, the touch-control panel shown in FIGS. 1 to 5 may be fabricated particularly in the following fabricating steps.

Step S1: forming the first carrier element, the first electrically conductive layer 22 and the first shadow eliminating layer 24 sequentially on one side of the substrate 10.

The particular process of the formation will be described below by taking the case as an example in which the first carrier element comprises the first carrier layer 21 and the second carrier layer 23.

Firstly, the first carrier layer 21 is firstly formed on the surface of one side of the substrate 10, wherein the first carrier layer 21 has the plurality of first grooves. Particularly, a first carrier film is formed on the surface of one side of the substrate 10 by spread coating, and the first carrier film is solidified to reduce its fluidity. Subsequently, the first carrier film is impressed by using a first mold, to transfer the pattern of the first mold to the first carrier film, to obtain the first carrier layer 21.

Subsequently, the first electrically conductive layer 22 is formed inside the first grooves of the first carrier layer 21, wherein the first electrically conductive layer 22 comprises the plurality of first electrically conducting lines 221. Particularly, the first grooves of the first carrier layer 21 are filled with an electrically conductive silver paste, and the electrically conductive silver paste is solidified, to obtain the first electrically conductive layer 22. Alternatively, a metal layer is deposited on the surface of the first carrier layer 21 that is away from the substrate 10 and inside the first grooves, and the metal layer is patterned, to form the first electrically conductive layer 22. The material of the metal layer may be at least one of copper, molybdenum, aluminum and titanium.

After the first electrically conductive layer 22 has been formed inside the first grooves of the first carrier layer 21, the second carrier layer 23 is formed on the side of the first carrier layer 21 that is away from the substrate 10, wherein the second carrier layer 23 has the plurality of second grooves. Particularly, a second carrier film is formed on the surfaces of the first carrier layer 21 and the first electrically conductive layer 22 that are away from the substrate 10 by spread coating, and the second carrier film is solidified to reduce its fluidity. Subsequently, the second carrier film is impressed by using a second mold, to transfer the pattern of the second mold to the second carrier film, to obtain the second carrier layer 23. The second mold and the first mold may be the same mold.

After the second carrier layer 23 has been formed, the second grooves of the second carrier layer 23 are filled with the first shadow eliminating layer 24, and the first shadow eliminating layer 24 is solidified, wherein the orthographic projection of the first shadow eliminating layer 24 on the substrate 10 covers the orthographic projection of the first electrically conductive layer 22 on the substrate 10.

Step S2: forming the second carrier element and the second electrically conductive layer 34 on one side of the substrate 10.

The particular process of the formation will be described below by taking the case as an example in which the first carrier element comprises the fourth carrier layer 31 and the fifth carrier layer 33.

In an optional embodiment, the fourth carrier layer 31, the second shadow eliminating layer 32, the fifth carrier layer 33 and the second electrically conductive layer 34 are formed sequentially on the surface of the other side of the substrate 10.

Firstly, the fourth carrier layer 31 is formed, wherein the fourth carrier layer 31 has the plurality of fourth grooves. Particularly, a fourth carrier film is formed on the surface of the other side of the substrate 10 by spread coating, and the fourth carrier film is solidified to reduce its fluidity. Subsequently, the fourth carrier film is impressed by using a third mold, to transfer the pattern of the third mold to the fourth carrier film, to obtain the fourth carrier layer 31. The third mold is different from the first mold.

Subsequently, the second shadow eliminating layer 32 is formed inside the fourth grooves of the fourth carrier layer 31, and the second shadow eliminating layer 32 is solidified.

Subsequently, the fifth carrier layer 33 is formed on the side of the fourth carrier layer 31 that is away from the substrate 10, wherein the fifth carrier layer 33 has the plurality of fifth grooves. Particularly, a fifth carrier film is formed on the surfaces of the fourth carrier layer 31 and the second shadow eliminating layer 32 that are away from the substrate 10 by spread coating, and the fifth carrier film is solidified to reduce its fluidity. Subsequently, the fifth carrier film is impressed by using a fourth mold, to transfer the pattern of the fourth mold to the fifth carrier film, to obtain the fifth carrier layer 33. The fourth mold and the third mold may be the same mold.

Finally, the second electrically conductive layer 34 is formed inside the fifth grooves of the fifth carrier layer 33, wherein the second electrically conductive layer 34 comprises the plurality of second electrically conducting lines 341, and the orthographic projection of the second shadow eliminating layer 32 on the substrate 10 covers the orthographic projection of the second electrically conductive layer 34 on the substrate 10. The process of forming the second electrically conductive layer 34 is similar to that of the first electrically conductive layer 22, and is not discussed herein further.

Figure 15:
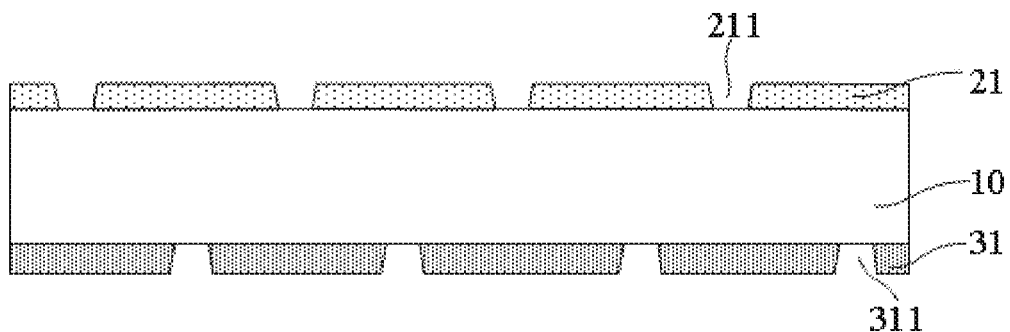
FIG. 15 schematically shows a schematic diagram after the first carrier layer and the fourth carrier layer have been formed on the two sides of the substrate according to an embodiment of the present application.
Figure 16:
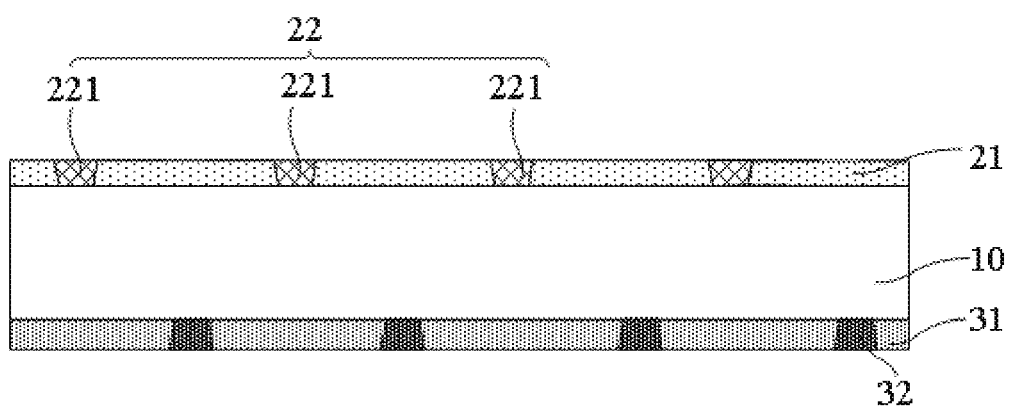
FIG. 16 schematically shows a schematic diagram after the first electrically conductive layer has been formed inside the first grooves and the second shadow eliminating layer has been formed inside the fourth grooves according to an embodiment of the present application.
Figure 17:
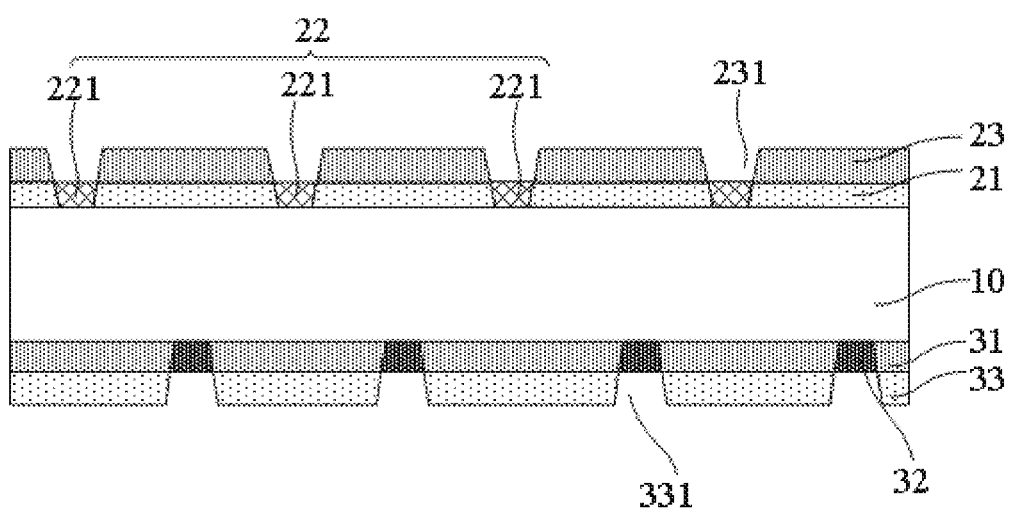
FIG. 17 schematically shows a schematic diagram after the second carrier layer and the fifth carrier layer have been formed according to an embodiment of the present application.

It should be noted that, regarding the first electrically conductive layer 22 and the second electrically conductive layer 34 that are arranged on the different sides, the process may also comprise forming the first carrier film and the fourth carrier film on the opposite surfaces of the substrate 10 by spread coating, solidifying the first carrier film and the fourth carrier film, and, after the solidification, impressing the first carrier film and the fourth carrier film, to obtain the structure shown in FIG. 15, i.e., forming the first carrier layer 21 on the surface of one side of the substrate 10, wherein the first carrier layer 21 has the plurality of first grooves 221, and forming the fourth carrier layer 31 on the surface of the other side of the substrate 10, wherein the fourth carrier layer 31 has the plurality of fourth grooves 311; subsequently, forming the first electrically conductive layer 22 inside the first grooves 211 of the first carrier layer 21, and forming the second shadow eliminating layer 32 inside the fourth grooves 311 of the fourth carrier layer 31, to obtain the structure shown in FIG. 16; subsequently, forming the second carrier film on the surfaces of the first carrier layer 21 and the first electrically conductive layer 22 that are away from the substrate 10 by spread coating, forming the fifth carrier film on the surfaces of the fourth carrier layer 31 and the second shadow eliminating layer 32 that are away from the substrate 10 by spread coating, solidifying the second carrier film and the fifth carrier film, and, after the solidification, impressing the second carrier film and the fifth carrier film, to obtain the structure shown in FIG. 17, i.e., to realize that the second carrier layer 23 is formed on the side of the first carrier layer 21 that is away from the substrate 10, and the fifth carrier layer 33 is formed on the side of the fourth carrier layer 31 that is away from the substrate 10, wherein the second carrier layer 23 has the plurality of second grooves 231, and the fifth carrier layer 33 has the plurality of fifth grooves 331; and finally, forming the first shadow eliminating layer 24 inside the second grooves 231 of the second carrier layer 23, and forming the second electrically conductive layer 34 inside the fifth grooves 331 of the fifth carrier layer 33, to obtain the touch-control panel shown in FIG. 1.

In another optional embodiment, after the first carrier layer 21, the first electrically conductive layer 22, the second carrier layer 23 and the first shadow eliminating layer 24 have been formed sequentially on one side of the substrate 10, the insulating layer 40 covering the second carrier layer 23 and the first shadow eliminating layer 24 is firstly formed, and subsequently the fifth carrier layer 33, the second electrically conductive layer 34, the fourth carrier layer 31 and the second shadow eliminating layer 32 are formed sequentially on the surface of the side of the insulating layer 40 that is away from the substrate 10, to obtain the touch-control panel shown in FIG. 2.

Figure 18:
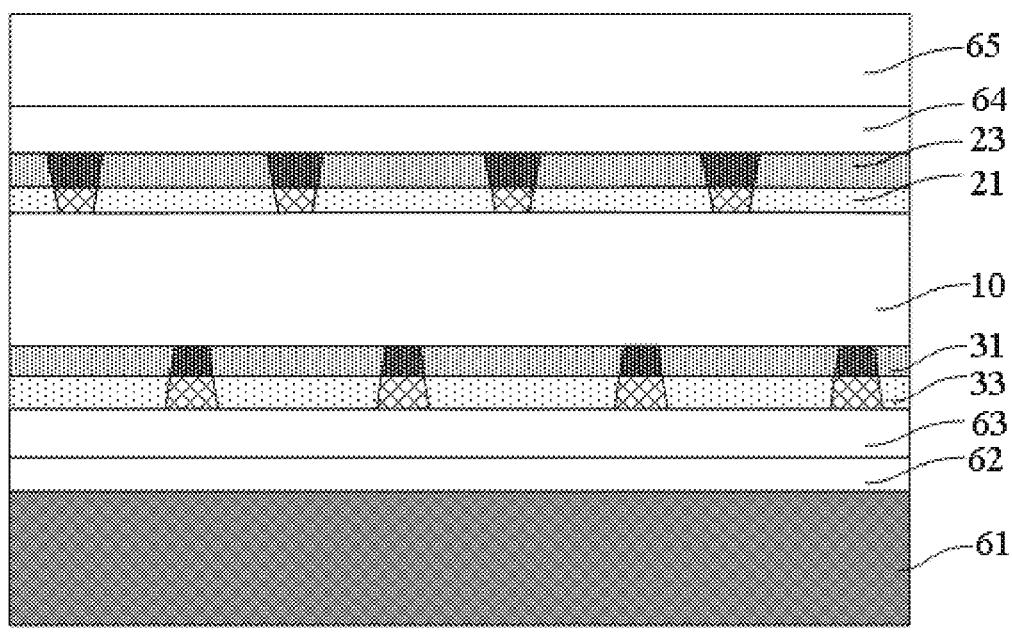
FIG. 18 schematically shows a schematic structural diagram of the touch-control displaying device according to an embodiment of the present application.

Referring to FIG. 18, FIG. 18 shows a schematic structural diagram of the touch-control displaying device according to an embodiment of the present application.

An embodiment of the present application further discloses a touch-control displaying device, wherein the touch-control displaying device comprises a display panel 61 and the touch-control panel stated above, and the display panel 61 is located on the side of the substrate 10 that is away from the first carrier element. In this case, the light-exiting face of the display panel 61 faces the touch-control panel.

The display panel 61 may be an OLED (Organic Light Emitting Diode) display panel, an LCD (Liquid Crystal Display) display panel, a QLED (Quantum Dots Light Emitting Diode) display panel and so on.

In the practical product, the display panel comprises a plurality of sub-pixels that are distributed in an array, and the orthographic projections of the first electrically conducting lines 221 and the second electrically conducting lines 341 on the display panel 61 and the pixel opening regions of the sub-pixels at least partially have a non-coinciding region, to ensure that the light rays of the display panel can normally pass through the touch-control panel and exit.

Optionally, when the touch-control panel is provided on the light exiting side of the display panel 61 by using the On-cell technique, in this case, there is a very high requirement on the accuracy of the aligning between the display panel 61 and the touch-control panel. With the high accuracy of aligning, the orthographic projections of the first electrically conducting lines 221 and the second electrically conducting lines 341 on the display panel 61 may be provided in the region outside the pixel opening regions of the sub-pixels, or, in other words, the pixel opening regions of the sub-pixels are located in the gaps of the grids formed by the first electrically conducting lines 221 and the second electrically conducting lines 341, to increase the exitance of the light rays of the display panel.

As shown in FIG. 18, the touch-control displaying device further comprises: a polarizer 62 located on the light-exiting face of the display panel 61; a first adhesively bonding layer 63 located between the polarizer 62 and the touch-control panel; a second adhesively bonding layer 64 located on the side of the touch-control panel that is away from the first adhesively bonding layer 63; and a cover plate 65 located on the side of the second adhesively bonding layer 64 that is away from the touch-control panel. The material of the first adhesively bonding layer 63 and the second adhesively bonding layer 64 may be OCA (Optically Clear Adhesive), and the cover plate 65 may be a glass cover plate.

In practical implementations, the touch-control displaying device according to the embodiments of the present application may be any products or components that have the functions of touch controlling and displaying, such as a mobile phone, a tablet personal computer, a television set, a display, a notebook computer, a digital photo frame and a navigator.

Moreover, the particular structure of the touch-control panel in the touch-control displaying device may refer to the description on the touch-control panel stated above, and the effect is similar to the effect of the touch-control panel stated above, which, in order to avoid replication, is not discussed herein further.

The "one embodiment", "an embodiment" or "one or more embodiments" as used herein means that particular features, structures or characteristics described with reference to an embodiment are included in at least one embodiment of the present application. Moreover, it should be noted that here an example using the wording "in an embodiment" does not necessarily refer to the same embodiment.

The description provided herein describes many concrete details. However, it can be understood that the embodiments of the present application may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present application may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present application, and not to limit them. Although the present application is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A touch-control panel, wherein the touch-control panel comprises:
   a substrate;
   a first carrier element located on one side of the substrate, wherein the first carrier element has a plurality of first accommodating grooves;
   a first electrically conductive layer, comprising a plurality of first electrically conducting lines, wherein each of the first electrically conducting lines is located inside one of the first accommodating grooves; and
   a first shadow eliminating layer located inside the first accommodating grooves, wherein an orthographic projection of the first shadow eliminating layer on the substrate covers an orthographic projection of at least part of the first electrically conductive layer on the substrate;
   the touch-control panel further comprises:
   a second carrier element located on one side of the substrate, wherein the second carrier element has a plurality of second accommodating grooves; and
   a second electrically conductive layer, comprising a plurality of second electrically conducting lines, wherein each of the second electrically conducting lines is located inside one of the second accommodating grooves;
   the plurality of first electrically conducting lines form a plurality of first electrically conducting grids, the first electrically conducting lines, which correspond to at least some of the plurality of first electrically conducting grids, have first notches, and the first notches separate the first electrically conductive layer into a plurality of first electrically conducting elements;
   the plurality of second electrically conducting lines form a plurality of second electrically conducting grids, the second electrically conducting lines, which correspond to at least some of the plurality of second electrically conducting grids, have second notches, and the second notches separate the second electrically conductive layer into a plurality of second electrically conducting elements; and
   the plurality of first electrically conducting elements and the plurality of second electrically conducting elements together form a latticed first touch-controlling electrode and a latticed second touch-controlling electrode;
   the plurality of first electrically conducting elements include a plurality of instances of the first touch-controlling electrode that extend in a first direction, and the plurality of second electrically conducting elements include a plurality of instances of the second touch-controlling electrode that extend in a second direction, wherein the first direction intersects with the second direction;
   the plurality of first electrically conducting elements further include a plurality of first leisure electrodes provided between two neighboring instances of the first touch-controlling electrode, and each of the first leisure electrodes is insulated from the first touch-controlling electrodes by the first notches; and
   the plurality of second electrically conducting elements further include a plurality of second leisure electrodes provided between two neighboring instances of the second touch-controlling electrode, and each of the second leisure electrodes is insulated from the second touch-controlling electrodes by the second notches.

2. The touch-control panel according to claim 1, wherein the first carrier element comprises:
   a first carrier layer, wherein the first carrier layer has a plurality of first grooves; and
   a second carrier layer located on one side of the first carrier layer that is away from the substrate, wherein the second carrier layer has a plurality of second grooves;
   wherein the first accommodating groove comprises the first groove and the second groove, each of the first electrically conducting lines is located inside one of the first grooves, and the first shadow eliminating layer is located inside the second grooves; and
   the first carrier layer is insulated from the first electrically conductive layer, and the second carrier layer is insulated from the first shadow eliminating layer.

3. The touch-control panel according to claim 1, wherein the touch-control panel further comprises:
   a second shadow eliminating layer located inside the second accommodating grooves, wherein an orthographic projection of the second shadow eliminating layer on the substrate covers an orthographic projection of at least part of the second electrically conductive layer on the substrate.

4. The touch-control panel according to claim 3, wherein the second carrier element comprises:
   a fourth carrier layer, wherein the fourth carrier layer has a plurality of fourth grooves; and
   a fifth carrier layer located on a same side of the substrate where the fourth carrier layer is located, wherein the fifth carrier layer has a plurality of fifth grooves;
   wherein the second accommodating groove comprises the fourth groove and the fifth groove, the second shadow eliminating layer is located inside the fourth grooves, and each of the second electrically conducting lines is located inside one of the fifth grooves; and
   the fourth carrier layer is insulated from the second shadow eliminating layer, and the fifth carrier layer is insulated from the second electrically conductive layer.

5. The touch-control panel according to claim 1, wherein the first carrier element is located on a first side of the substrate, and the second carrier element is located on a second side of the substrate, wherein the first side and the second side are two opposite sides of the substrate.

6. The touch-control panel according to claim 3, wherein the orthographic projection of the first shadow eliminating layer on the substrate covers the entire orthographic projection of the first electrically conductive layer on the substrate; and
   the orthographic projection of the second shadow eliminating layer on the substrate covers the entire orthographic projection of the second electrically conductive layer on the substrate.

7. The touch-control panel according to claim 1, wherein a line width of the first electrically conducting lines is less than or equal to a line width of the second electrically conducting lines.

8. The touch-control panel according to claim 1, wherein both of a material of the first carrier element and a material of the second carrier element are a photo-solidified adhesive.

9. The touch-control panel according to claim 3, wherein both of the first shadow eliminating layer and the second shadow eliminating layer are a light shielding ink layer or a light shielding oxide layer, and a transmittance of the first shadow eliminating layer and a transmittance of the second shadow eliminating layer are less than or equal to 10%.

10. The touch-control panel according to claim 1, wherein the first electrically conducting grids and the second electrically conducting grids are arranged in stagger.

11. The touch-control panel according to claim 3, wherein all of cross-sectional shapes in a target cross section of the first electrically conducting lines, the first shadow eliminating layer inside each of the first accommodating grooves, the second electrically conducting lines and the second shadow eliminating layer inside each of the second accommodating grooves are substantially a trapezoid;
   a cross-sectional shape in the target cross section of a combined component of the first shadow eliminating layer and the first electrically conducting line inside each of the first accommodating grooves is substantially a trapezoid; and
   a cross-sectional shape in the target cross section of a combined component of the second shadow eliminating layer and the second electrically conducting line inside each of the second accommodating grooves is substantially a trapezoid;
   wherein the target cross section is perpendicular to a plane where the substrate is located, and is parallel to a direction of a line width of the electrically conducting lines inside a corresponding accommodating groove.

12. The touch-control panel according to claim 3, wherein a sum between a thickness of the first electrically conductive layer and a thickness of the first shadow eliminating layer is substantially equal to a thickness of the first carrier element; and
   a sum between a thickness of the second electrically conductive layer and a thickness of the second shadow eliminating layer is substantially equal to a thickness of the second carrier element.

13. The touch-control panel according to claim 2, wherein a surface of one side of the first electrically conductive layer that is away from the substrate and a surface of one side of the first carrier layer that is away from the substrate are substantially located in a same plane; and
   a surface of one side of the first shadow eliminating layer that is away from the substrate and a surface of one side of the second carrier layer that is away from the substrate are substantially located in a same plane.

14. The touch-control panel according to claim 4, wherein a surface of one side of the second shadow eliminating layer that is away from the substrate and a surface of one side of the fourth carrier layer that is away from the substrate are substantially located in a same plane; and
   a surface of one side of the second electrically conductive layer that is away from the substrate and a surface of one side of the fifth carrier layer that is away from the substrate are substantially located in a same plane.

15. The touch-control panel according to claim 1, wherein between the first leisure electrodes and the first touch-controlling electrodes, an extension direction of a first trajectory line formed by any at least two neighboring instances of the first notches intersects with the first direction, and extension directions of any two neighboring instances of the first trajectory line are intersected;

the first trajectory line is a straight line segment formed by at least two neighboring instances of the first notches between the first leisure electrodes and the first touch-controlling electrodes, and the first electrically conducting line where the first notch closest to a starting of the first trajectory line is located are in parallel with the first electrically conducting line where the first notch closest to an ending of the first trajectory line is located;

between the second leisure electrodes and the second touch-controlling electrodes, an extension direction of a second trajectory line formed by any at least two neighboring instances of the second notches intersects with the second direction, and extension directions of any two neighboring instances of the second trajectory line are intersected; and the second trajectory line is a straight line segment formed by at least two neighboring instances of the second notches between the second leisure electrodes and the second touch-controlling electrodes, and the second electrically conducting line where the second notch closest to a starting of the second trajectory line is located are in parallel with the second electrically conducting line where the second notch closest to an ending of the second trajectory line is located;

wherein each of the first leisure electrodes is separate from neighboring instances of the first leisure electrodes by a third trajectory line formed by the first notches, the third trajectory line is a straight line segment formed by at least two neighboring instances of the first notches between two instances of the first leisure electrodes, and the first electrically conducting line where the first notch closest to a starting of the third trajectory line is located are in parallel with the first electrically conducting line where the first notch closest to an ending of the third trajectory line is located;

each of the second leisure electrodes is separate from neighboring instances of the second leisure electrodes by a fourth trajectory line formed by the second notches, the fourth trajectory line is a straight line segment formed by at least two neighboring instances of the second notches between two instances of the second leisure electrodes, and the second electrically conducting line where the second notch closest to a starting of the fourth trajectory line is located are in parallel with the second electrically conducting line where the second notch closest to an ending of the fourth trajectory line is located;

wherein at least some of the first leisure electrodes in all of the first leisure electrodes comprise at least one closed instance of the first electrically conducting grids; and at least some of the second leisure electrodes in all of the second leisure electrodes comprise at least one closed instance of the second electrically conducting grids.

16. A touch-control displaying device, wherein the touch-control displaying device comprises a display panel and the touch-control panel according to claim 1, and the display panel is located on one side of the substrate that is away from the first carrier element.

* * * * *